Nov. 13, 1956 J. F. EARP 2,770,175
MACHINE FOR MAKING FLAT-TOPPED PAPER BOTTLES
Filed Nov. 5, 1952 17 Sheets-Sheet 2
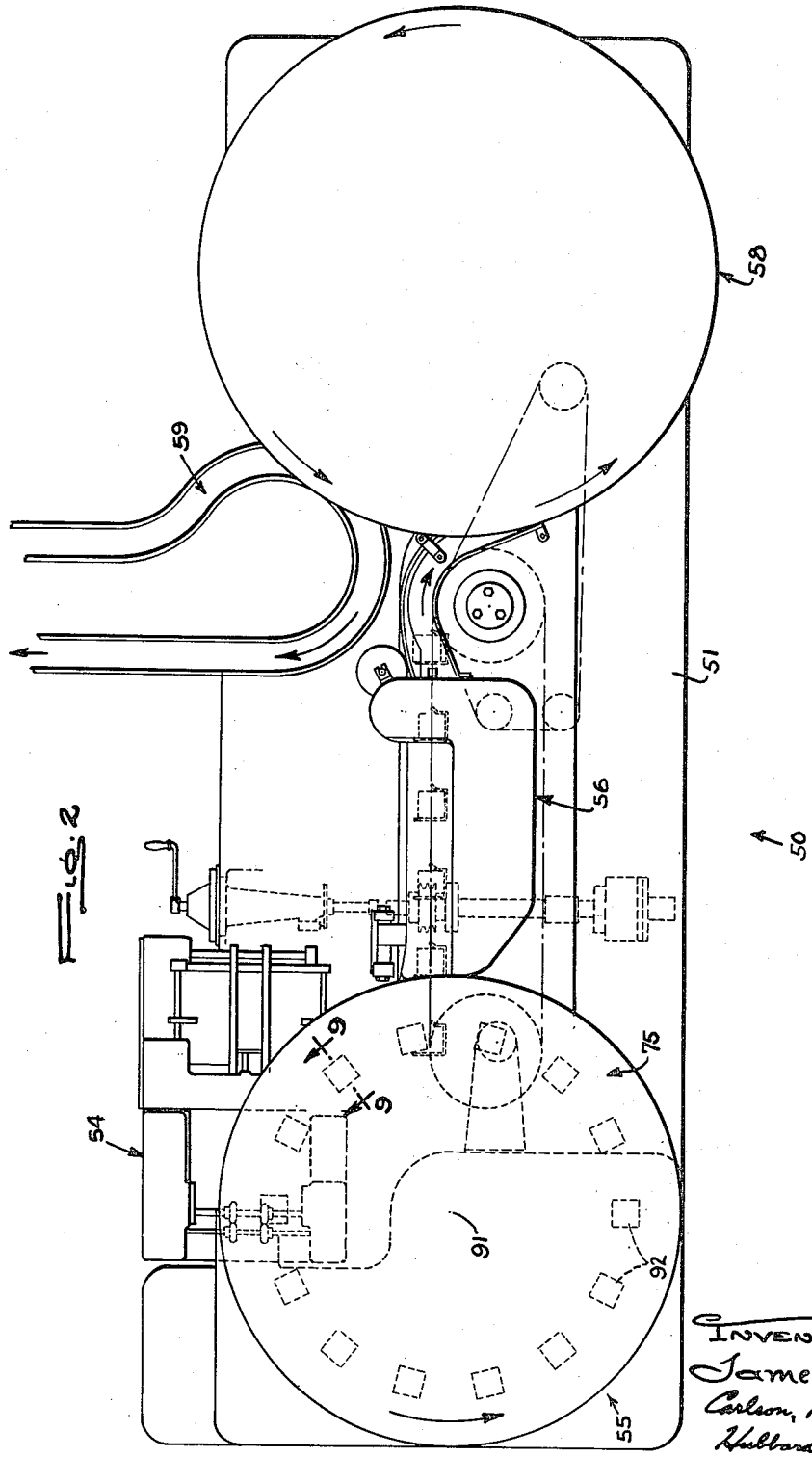

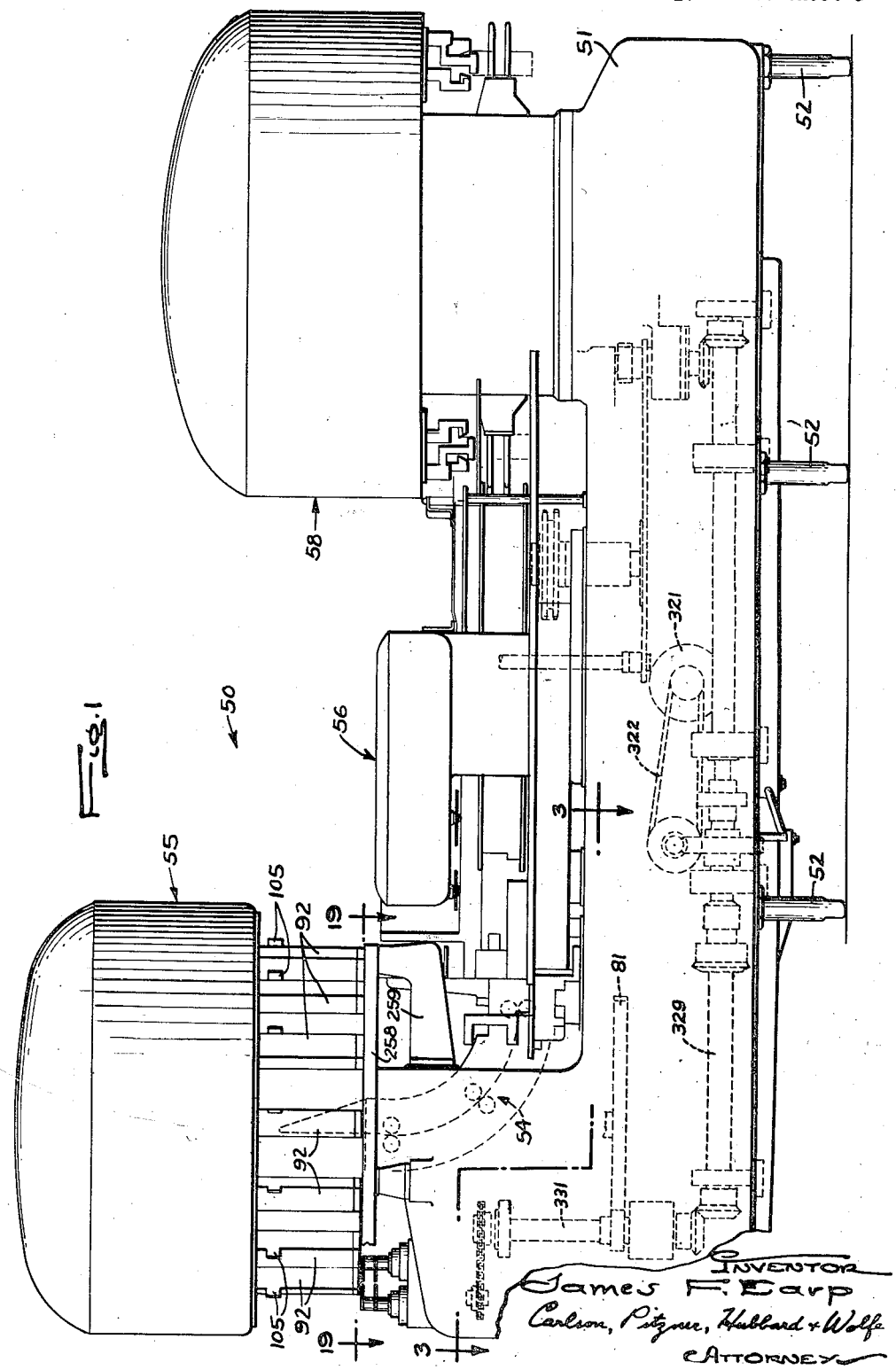

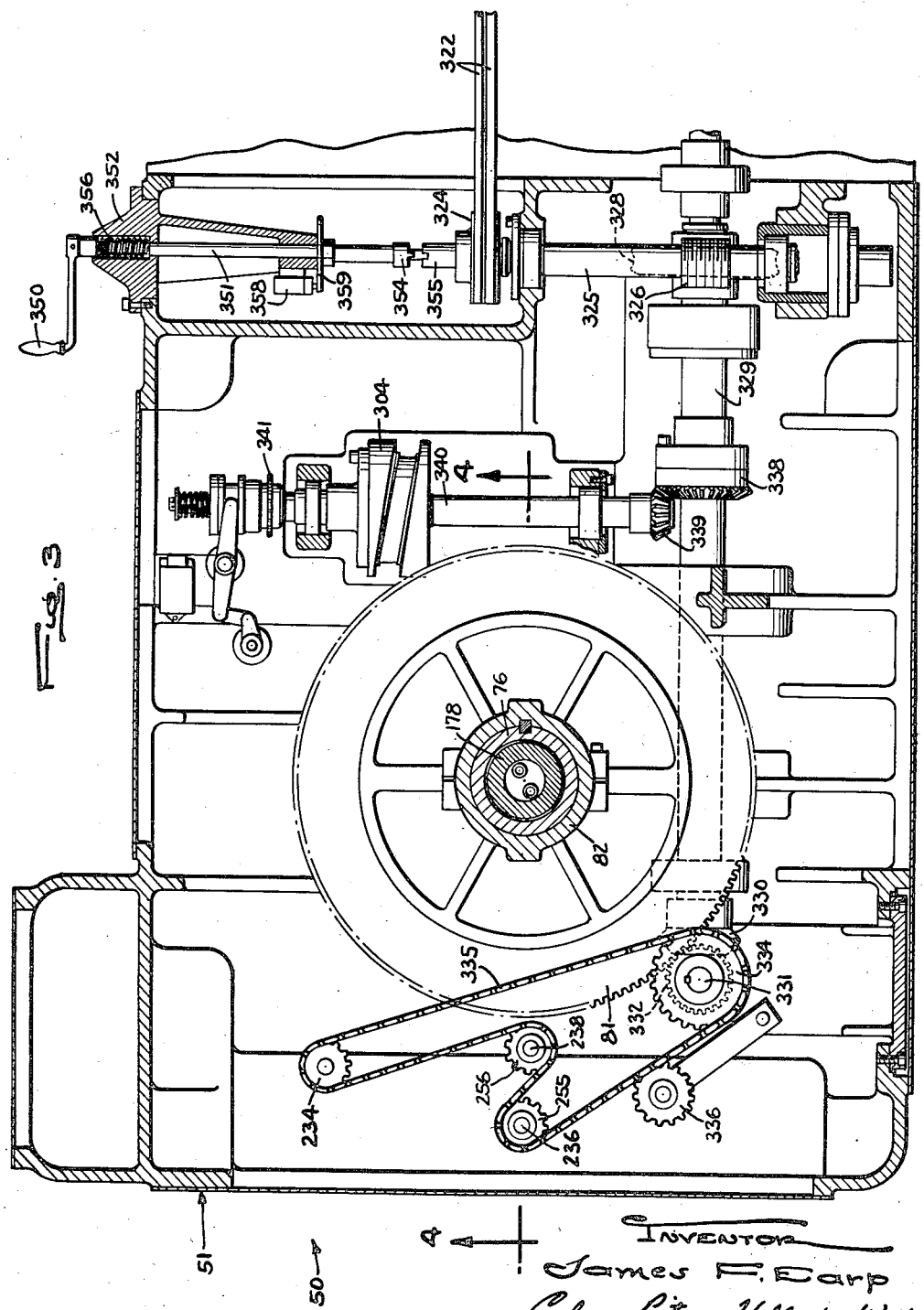

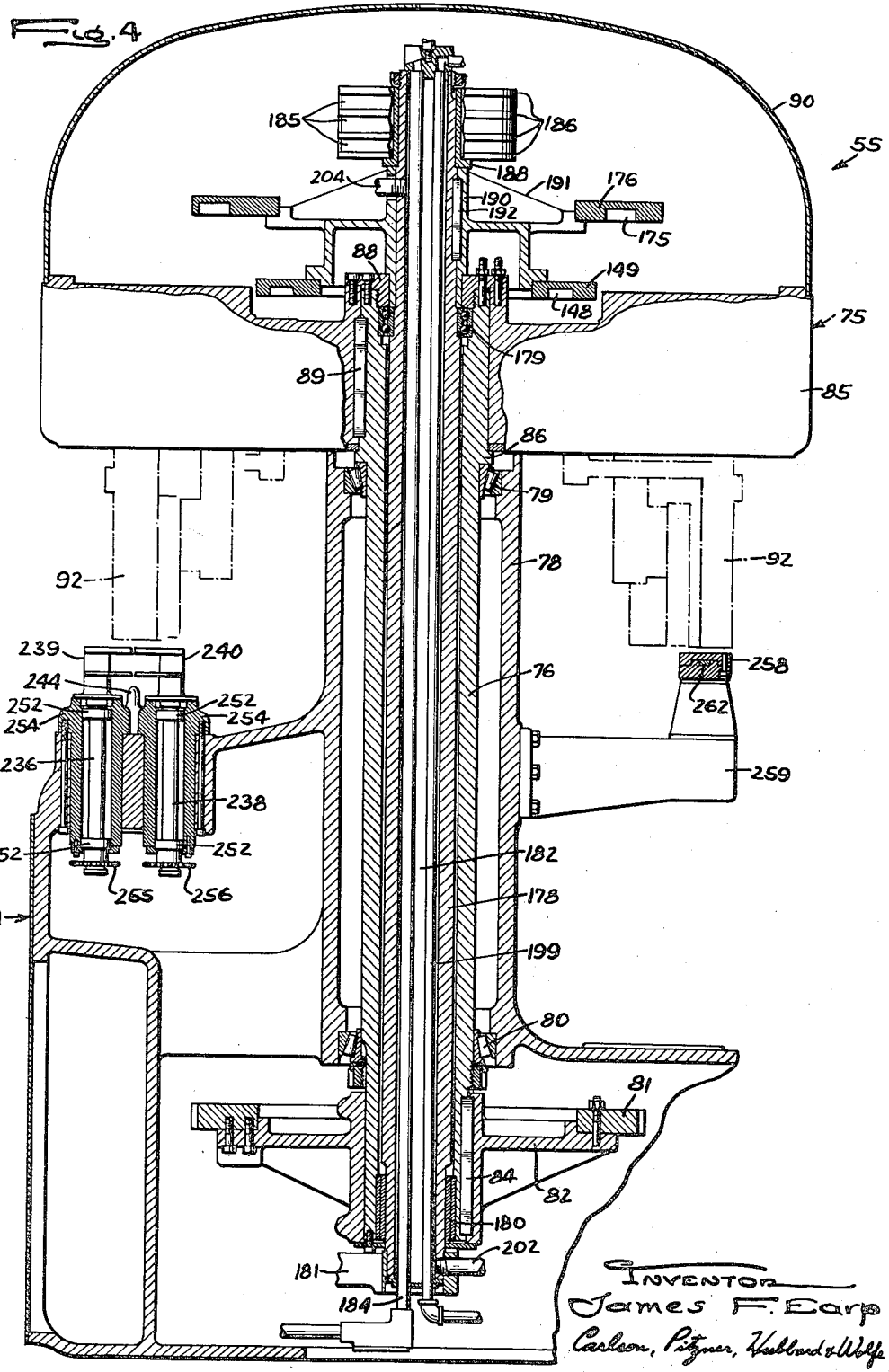

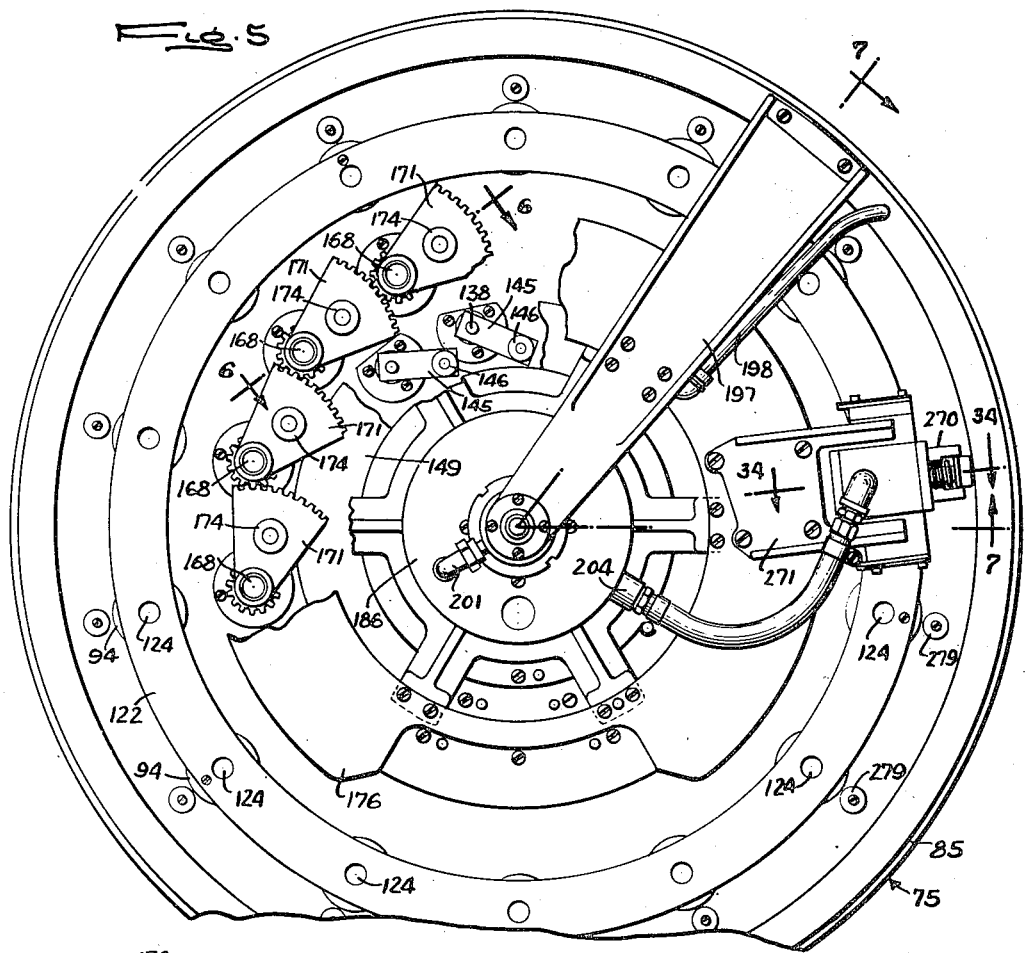
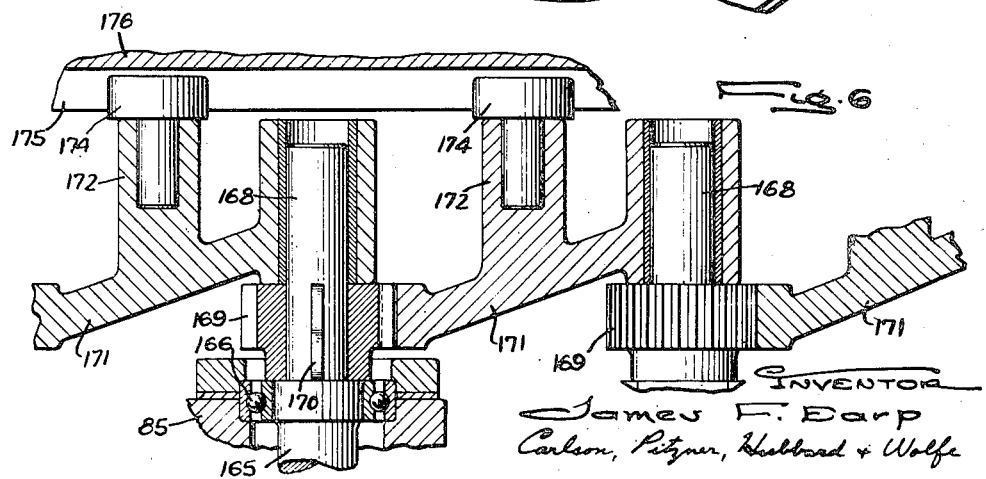

Nov. 13, 1956  J. F. EARP  2,770,175
MACHINE FOR MAKING FLAT-TOPPED PAPER BOTTLES
Filed Nov. 5, 1952  17 Sheets-Sheet 6
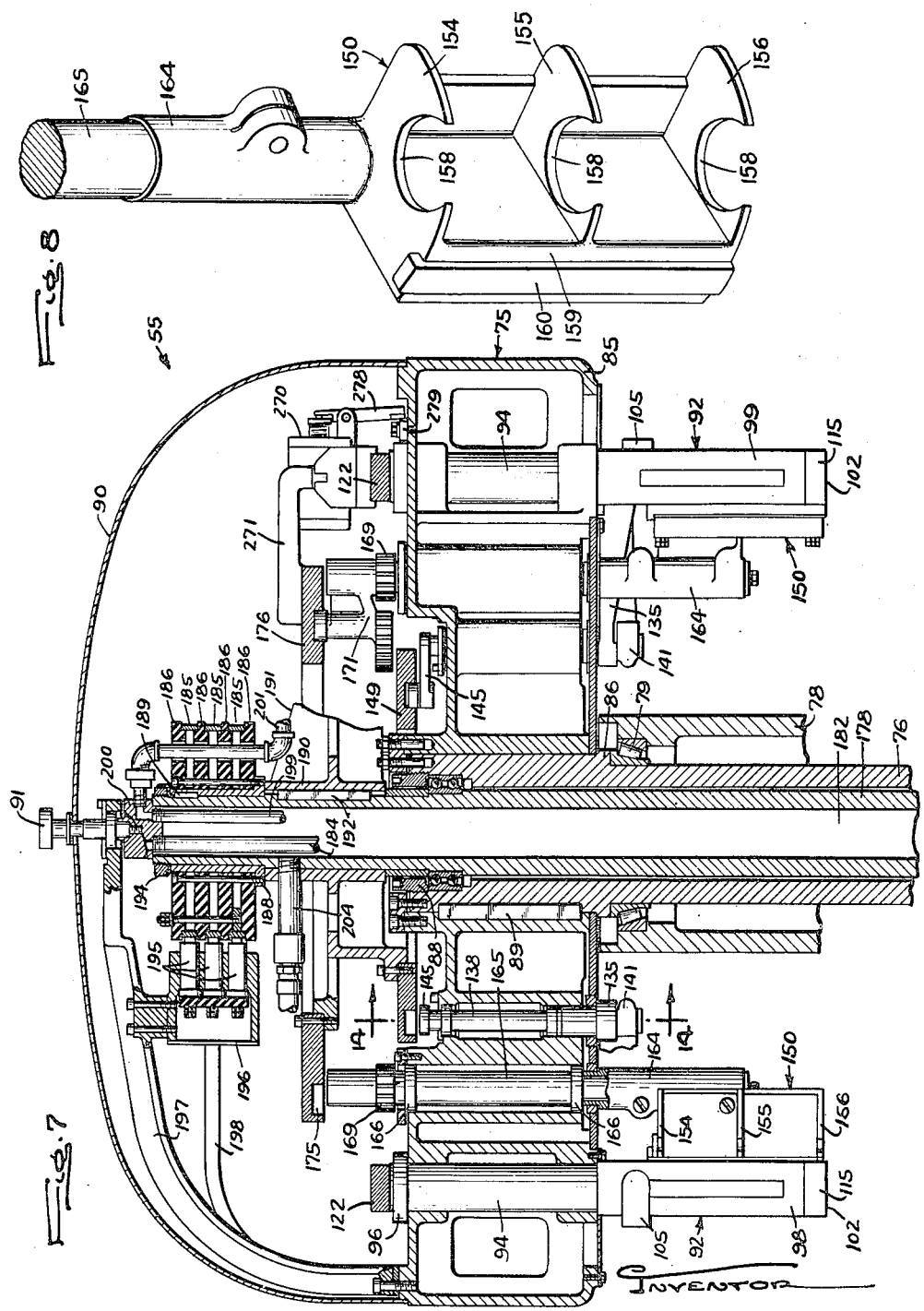
INVENTOR
James F. Earp
Carlson, Pitzner, Hubbard & Wolfe
ATTORNEY Nov. 13, 1956 J. F. EARP 2,770,175
MACHINE FOR MAKING FLAT-TOPPED PAPER BOTTLES
Filed Nov. 5, 1952 17 Sheets-Sheet 7
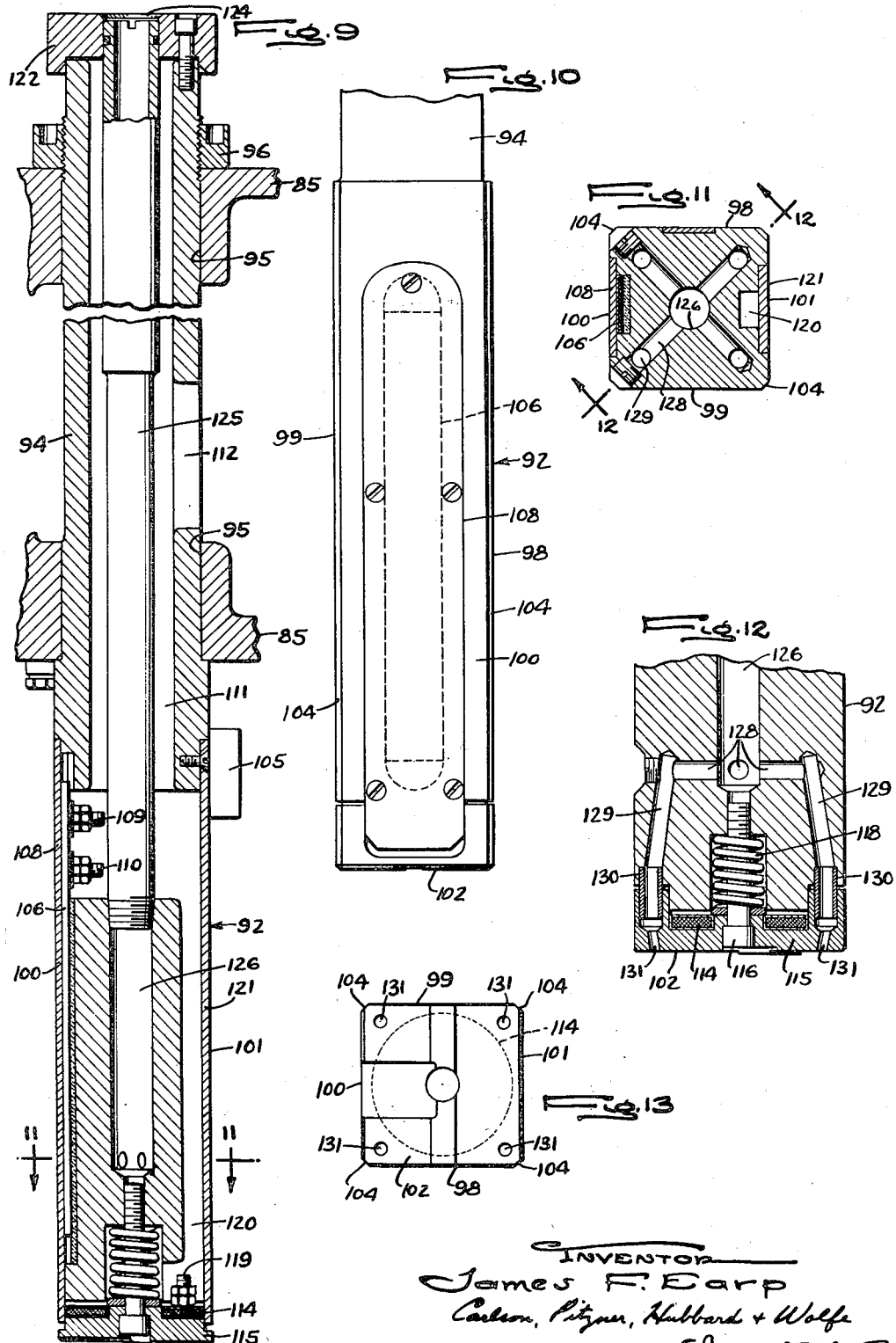

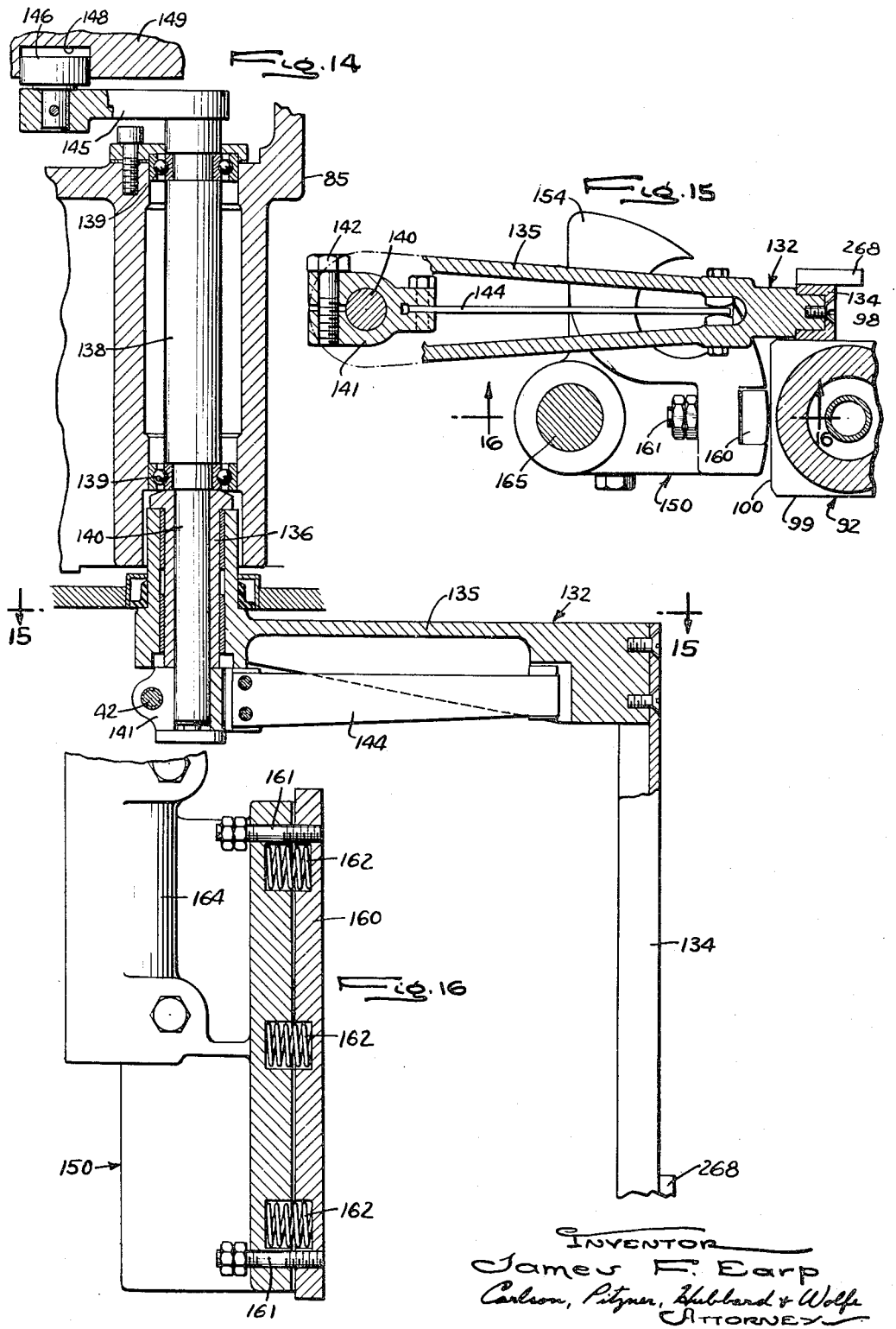

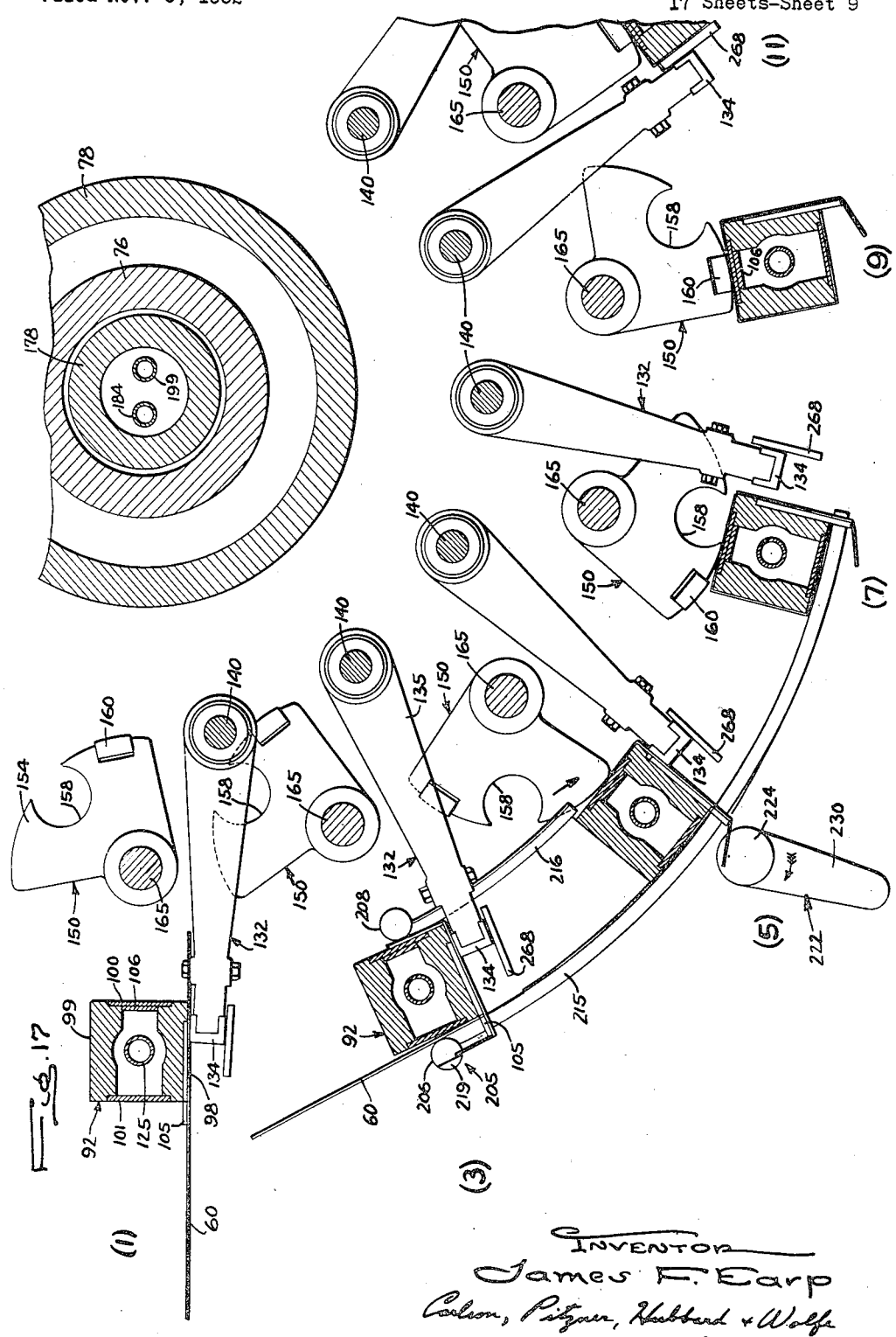

Nov. 13, 1956    J. F. EARP    2,770,175
MACHINE FOR MAKING FLAT-TOPPED PAPER BOTTLES
Filed Nov. 5, 1952    17 Sheets-Sheet 10
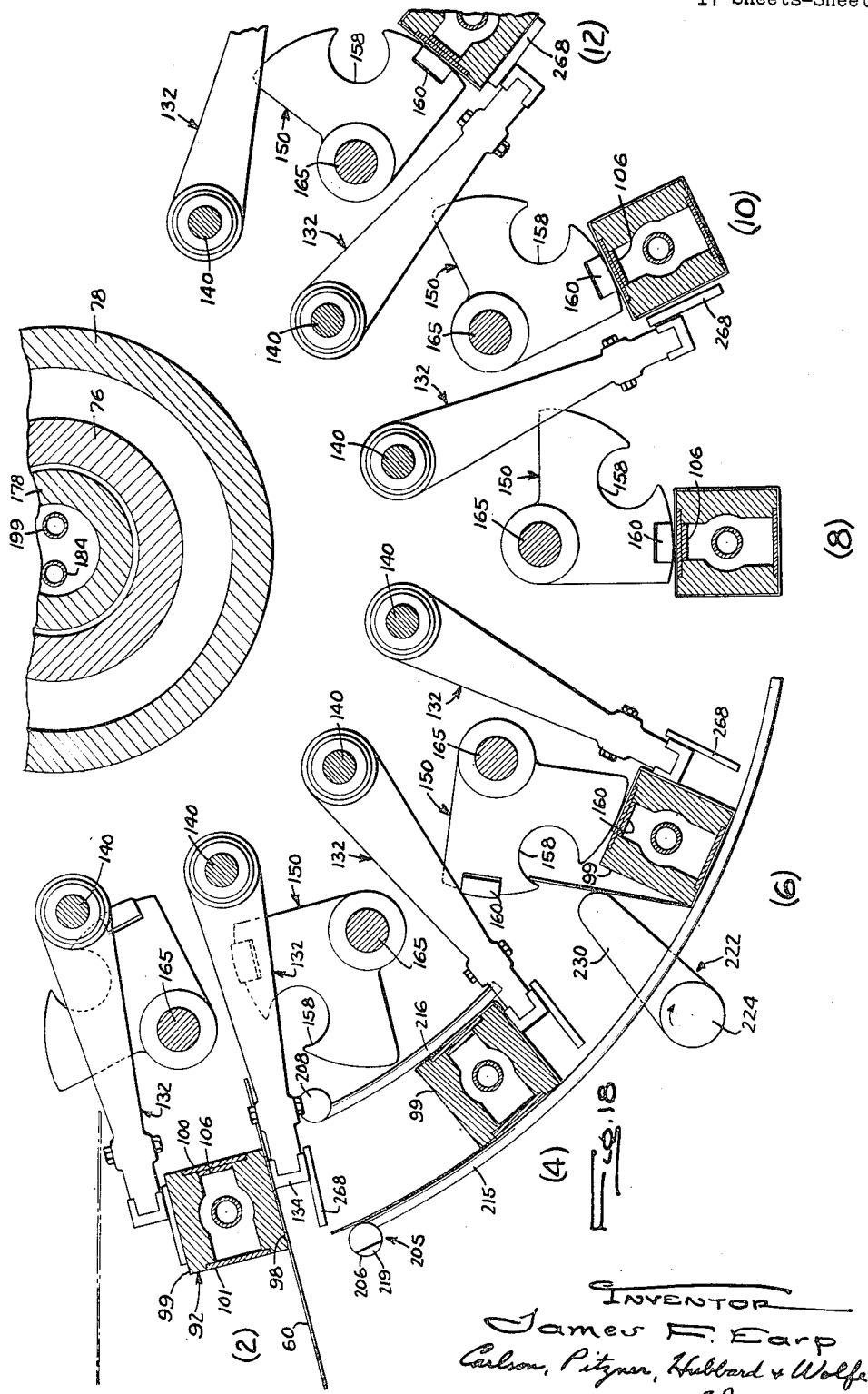

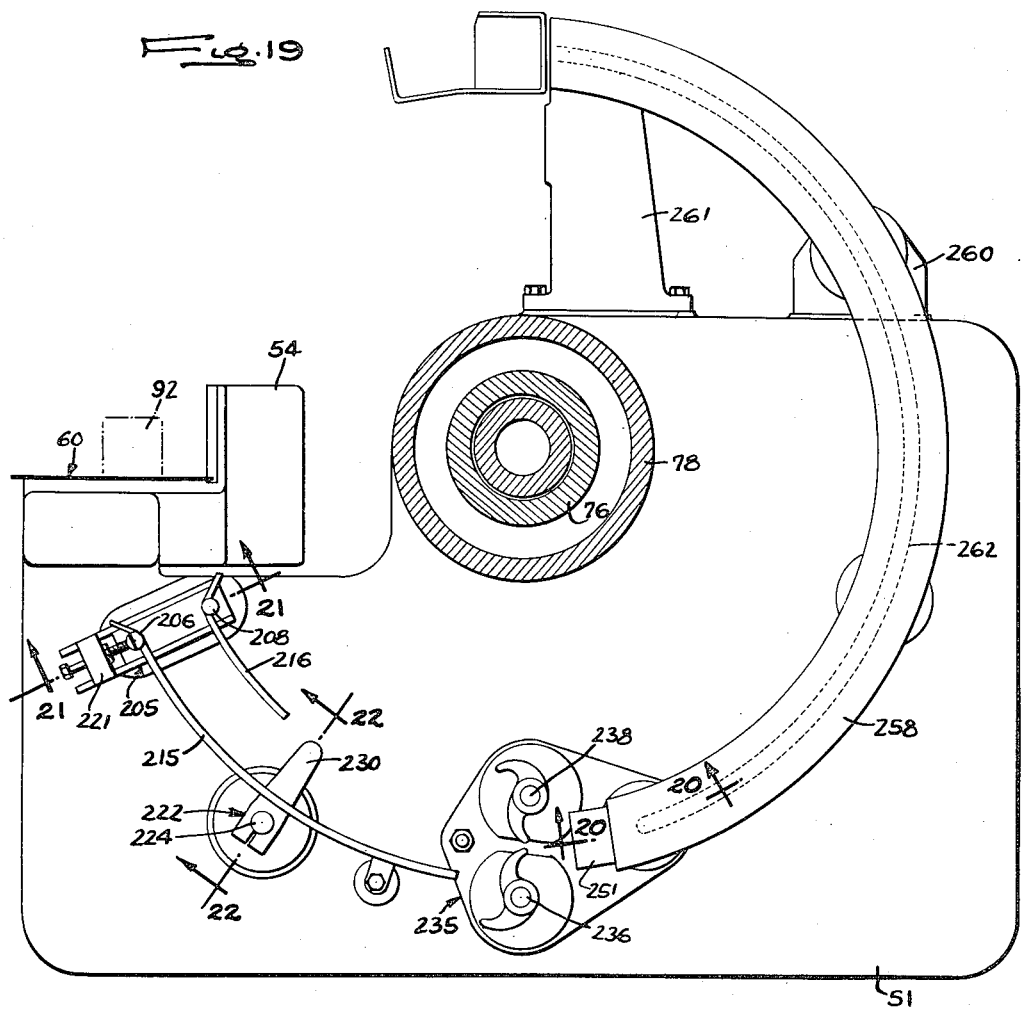
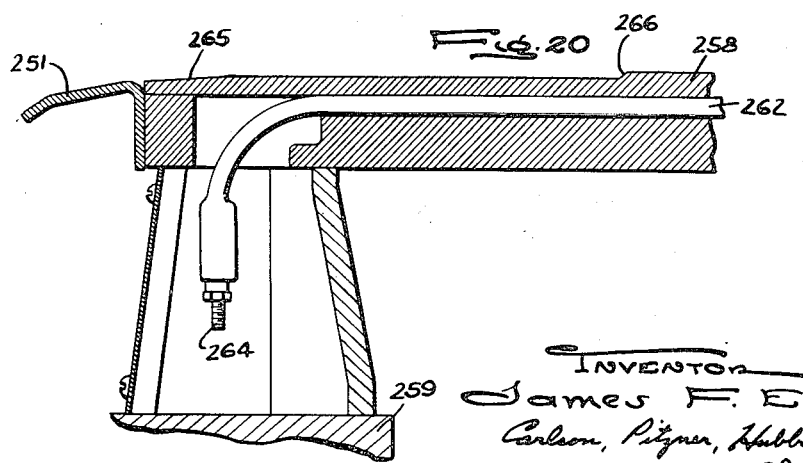

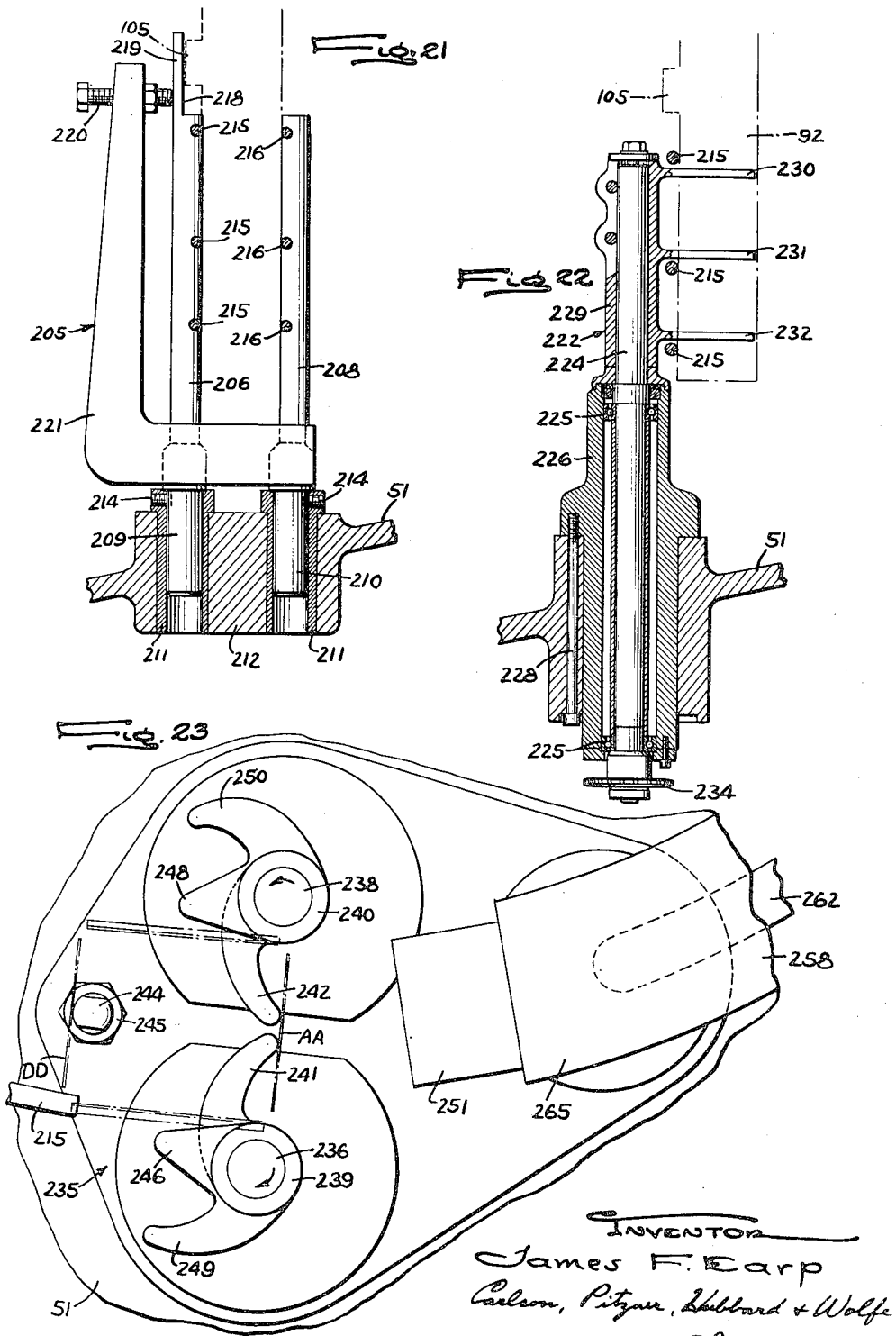

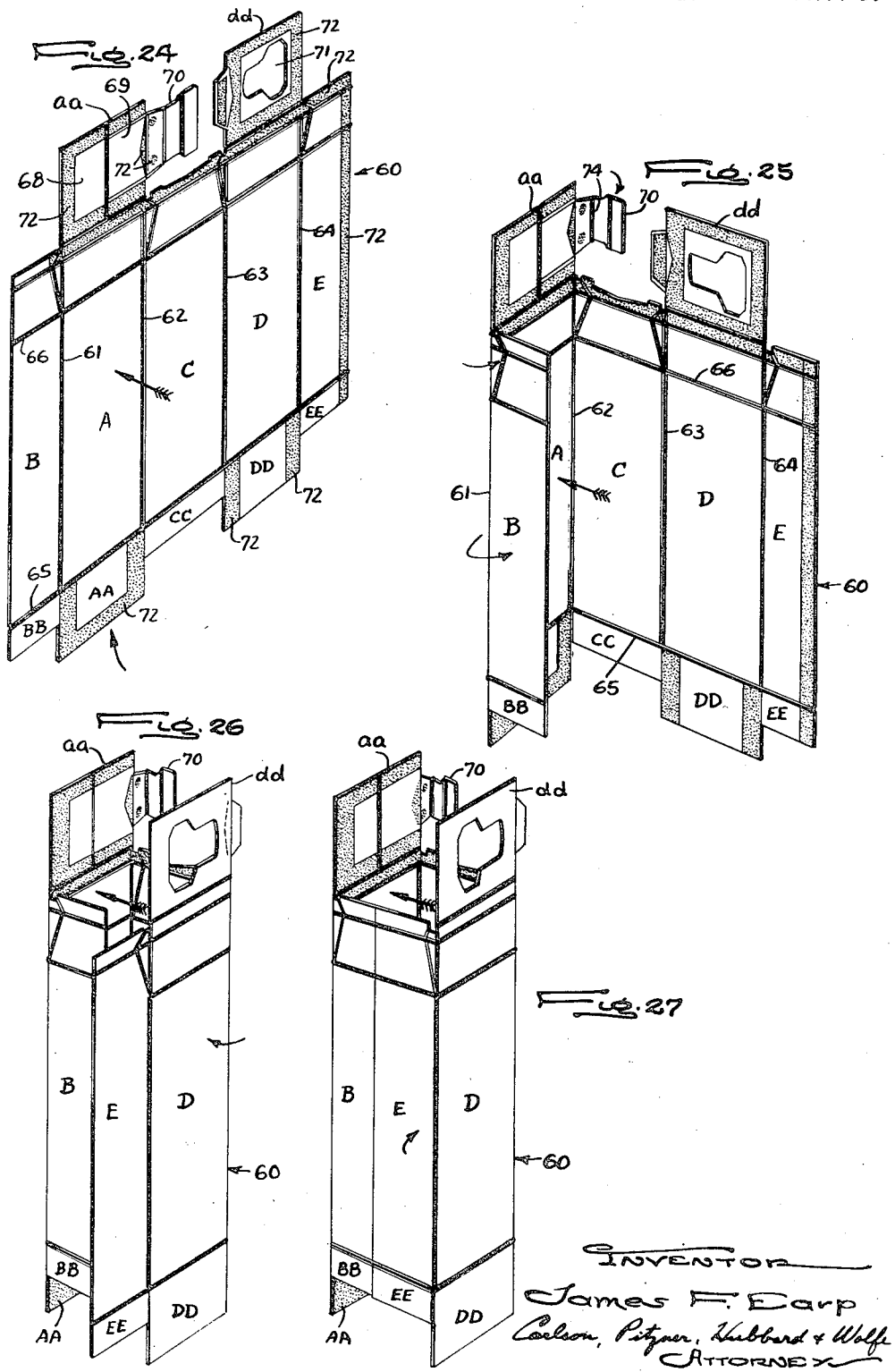

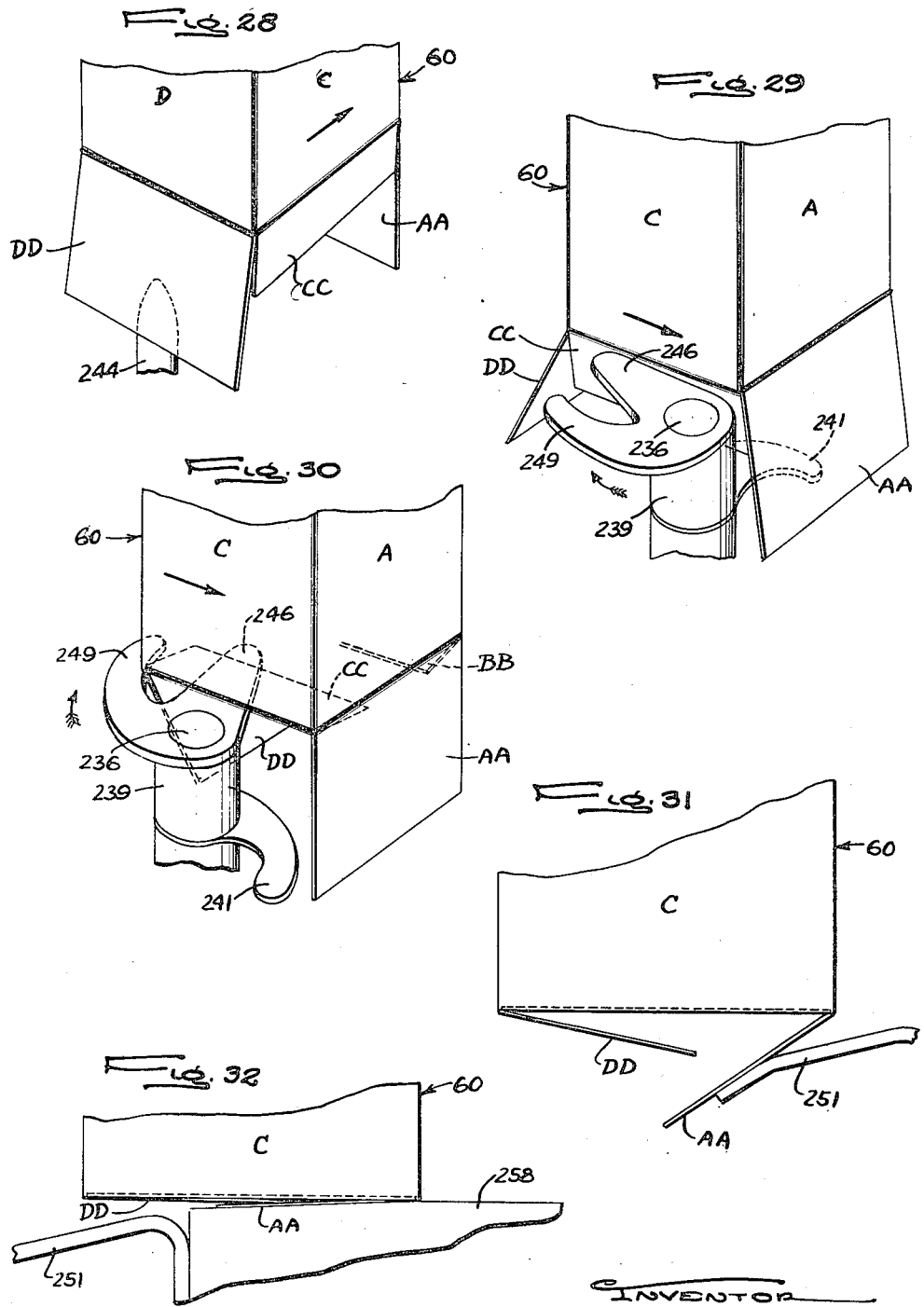

Nov. 13, 1956    J. F. EARP    2,770,175
MACHINE FOR MAKING FLAT-TOPPED PAPER BOTTLES
Filed Nov. 5, 1952    17 Sheets-Sheet 15
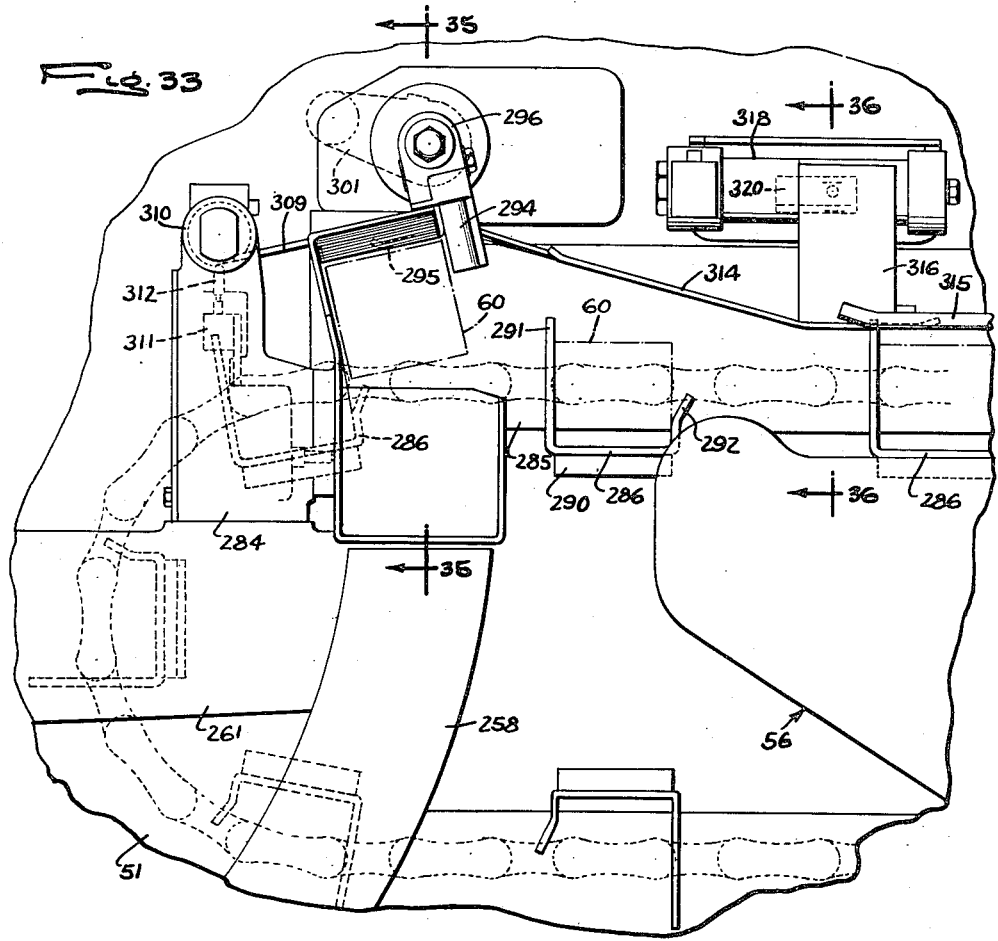
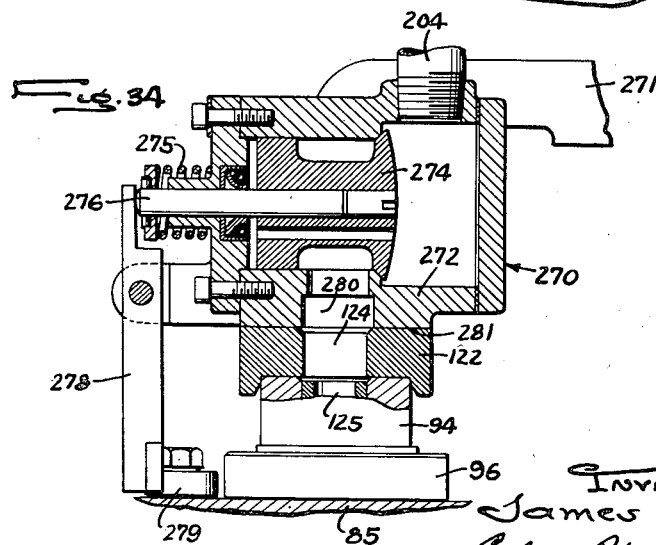
INVENTOR
James F. Earp
Carlson, Pitzner, Hubbard & Wolfe
ATTORNEY Nov. 13, 1956   J. F. EARP   2,770,175
MACHINE FOR MAKING FLAT-TOPPED PAPER BOTTLES
Filed Nov. 5, 1952   17 Sheets-Sheet 16
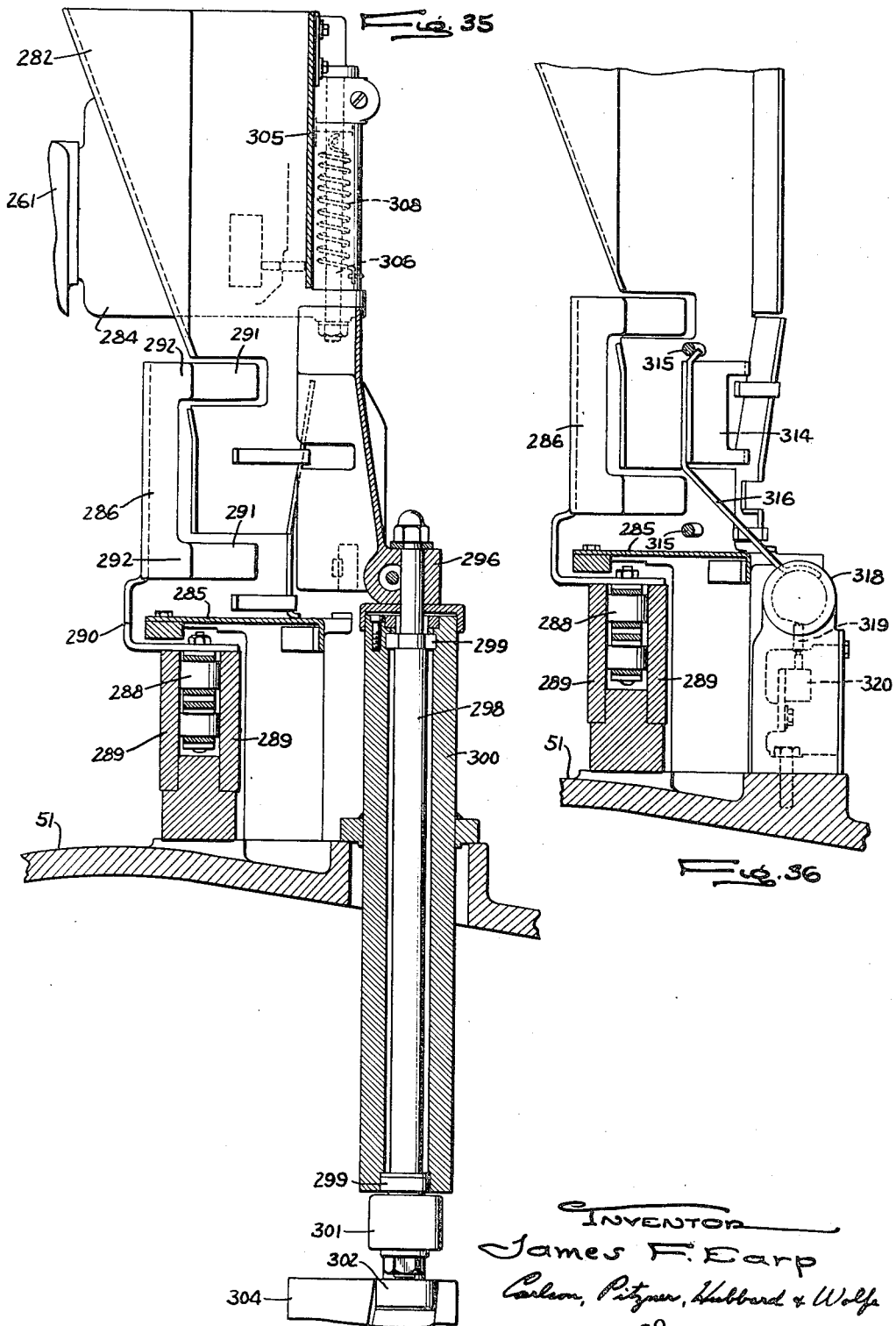

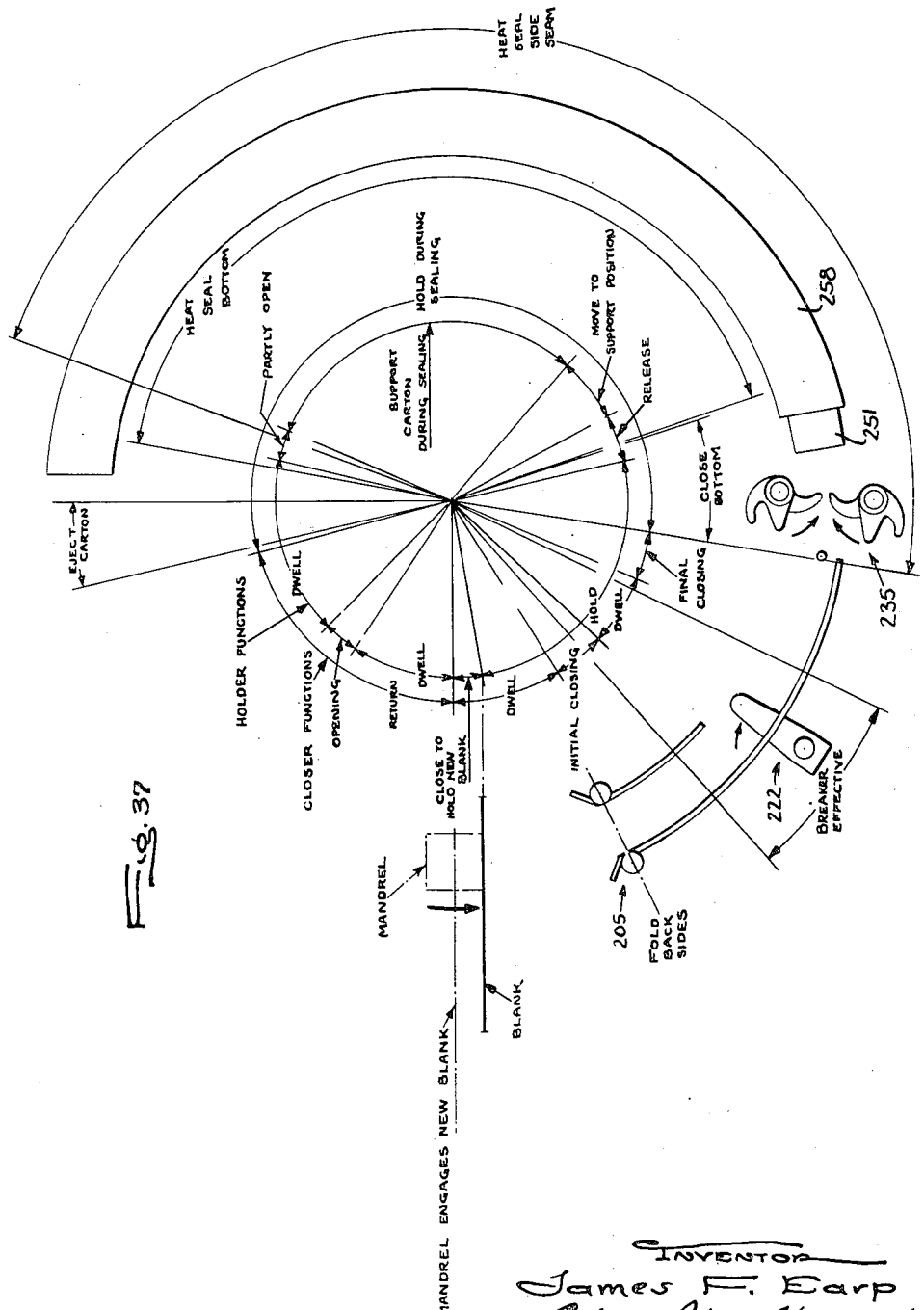

United States Patent Office 2,770,175
Patented Nov. 13, 1956

2,770,175

MACHINE FOR MAKING FLAT-TOPPED PAPER BOTTLES

James F. Earp, Detroit, Mich., assignor to Ex-Cell-O Corporation, Detroit, Mich., a corporation of Michigan Application November 5, 1952, Serial No. 318,882

12 Claims. (Cl. 93—44.1)

The present invention relates to container fabricating machines and, more specifically, to a machine for making disposable cartons of paperboard or other bendable sheet material.

The invention finds particular, but not exclusive, utility in a machine for forming flat-topped cartons such as the ones disclosed in copending application Serial No. 135,430, filed December 28, 1949, by Charles H. Dixon (now Patent No. 2,730,288), and also in Patent No. 2,581,237, issued January 1, 1952, upon the application of Roger H. Casler. Such cartons are self-sustaining in shape and, when coated or impregnated to render them impervious, are particularly well suited for the distribution of milk and other comestibles.

The general aim of the present invention is to provide a machine of the type set forth and having a novel carton body forming unit adapted to take from a feeder mechanism a flat blank properly cut and scored, to erect the blank into a hollow tubular carton body, and to complete the bottom closure of the carton body, ultimately presenting the formed body to associated mechanism for completing its top closure.

Another object is to provide a high-speed, continuous motion machine of the character set forth, performing its operations upon a procession of blanks moving through the machine at a rapid but substantially constant rate.

A further object is to provide a machine of the character set forth and which will be easy to clean and maintain, fully conforming to the rigorous sanitary requirements that must be met for dairy equipment and similar applications.

Other objects and advantages will become apparent as the following detailed description proceeds, taken together with the accompanying drawings, in which:

Figure 1 is a side elevation of an illustrative carton fabricating machine embodying the present invention.

Fig. 2 is a plan view of the illustrative machine of Fig. 1.

Fig. 3 is an enlarged, fragmentary, horizontal sectional view showing a portion of the drive mechcanism and taken in the plane of the line 3—3 in Fig. 1.

Fig. 4 is an enlarged vertical sectional view through the body forming turret, taken in the plane of the line 4—4 in Fig. 3.

Fig. 5 is a further enlarged, fragmentary plan view of the body forming turret with its cover removed.

Fig. 6 is an enlarged vertical sectional view taken in the plane of the line 6—6 in Fig. 5.

Fig. 7 is an enlarged vertical sectional view detailing certain members in the body forming turret, taken along line 7—7 in Fig. 5.

Fig. 8 is an enlarged perspective view detailing one of the closers carried by the body forming turret.

Fig. 9 is an enlarged, fragmentary vertical sectional view through one of the mandrels carried by the body forming turret, taken along the line 9—9 of Fig. 2.

Fig. 10 is a fragmentary elevation showing the side seam heater embedded in the left-hand face of the mandrel of Fig. 9.

Fig. 11 is a transverse sectional view taken in the plane of the line 11—11 of Fig. 9.

Fig. 12 is a fragmentary, vertical sectional view taken in the plane of the line 12—12 of Fig. 11.

Fig. 13 is a bottom plan view of the mandrel of Fig. 9.

Fig. 14 is an enlarged, fragmentary, vertical sectional view taken in the plane of the line 14—14 in Fig. 7.

Fig. 15 is a horizontal sectional view taken along the line 15—15 in Fig. 14.

Fig. 16 is a fragmentary, vertical sectional view taken in the plane of the line 16—16 in Fig. 15.

Figs. 17 and 18 are enlarged, fragmentary, horizontal sectional views through the mandrels of the body forming turret and showing sequentially certain steps in manipulation of the blanks.

Fig. 19 is an enlarged, fragmentary, horizontal sectional view taken in the plane of line 19—19 in Fig. 1 and detailing certain elements adapted to cooperate with the body forming turret.

Fig. 20 is an enlarged, fragmentary, vertical sectional view taken along the arcuate line 20—20 in Fig. 19.

Figs. 21 and 22 are enlarged, fragmentary, vertical sectional views taken respectively along the lines 21—21 and 22—22 in Fig. 19.

Fig. 23 is an enlarged, fragmentary plan view detailing the bottom flap closing mechanism.

Figs. 24, 25, 26 and 27 are perspective views detailing sequentially the transition of the carton body from a flat blank to an upright rectangular tube.

Figs. 28, 29, 30, 31 and 32 are perspective views detailing sequentially the various steps in the closure of the bottom flaps of a carton body.

Fig. 33 is an enlarged, fragmentary plan view showing the ejection station at which the carton bodies leave the body forming unit.

Fig. 34 is an enlarged, fragmentary, vertical sectional view taken along the line 34—34 in Fig. 5 and detailing the carton ejector air valve.

Figs. 35 and 36 are enlarged, fragmentary, vertical sectional views taken respectively in the planes of the lines 35—35 and 36—36 in Fig. 33.

Fig. 37 is a diagrammatic view which summarizes the operation of the body forming unit of the machine.

While the invention is susceptible of various modifications and alternative constructions, a carton fabricating machine representing an illustrative embodiment of the invention has been shown in the drawings and will be described below in considerable detail. It should be understood, however, that there is no intention to limit the invention to the specific form disclosed, but on the contrary, the intention is to cover all modifications, alternative constructions, and equivalents, falling within the spirit and scope of the invention as expressed in the appended claims.

*General machine organization*

Referring more specifically to Figs. 1 and 2, the invention is there exemplified in an illustrative container fabricating machine 50 which in the present instance is of the continuous motion type. By this it is meant that the cartons being formed by the machine are moved through the latter in a continuous procession at a substantially constant rate, the forming operations being carried on while the carton blanks and bodies are in motion rather than while they are momentarily halted.

The machine 50 comprises a base 51 fashioned as a closed housing and having legs 52 which support the base a sufficient distance above the floor to permit thorough cleaning and inspection beneath the machine. Mounted on the base 51 are a blank feeder mechanism 54, a body forming unit 55, a preformer unit 56, a top closure unit 58 and a discharge conveyor 59. The blank feeder mechanism 54, which may be similar to the one disclosed in copending application Serial No. 50,147, filed September 20, 1948, by Arthur J. Lewis, now U. S. Patent No. 2,636,733, is adapted to hold a stack of single ply, horizontally disposed blanks and to feed them one by one up an arcuate guideway, presenting each blank in a vertical position to the body forming unit 55. This unit is constructed and arranged to erect each blank into a tubular carton body and to complete the bottom closure of the carton body, eventually delivering the latter to the preformer unit 56. The preformer unit 56 is arranged to break the top closure elements of the carton body in the proper manner to facilitate the subsequent steps in the formation of the top closure. An appropriate conveying means moves each carton body through the preformer unit 56 and thereupon delivers it to the top closure unit 58. This unit performs all the steps necessary to complete the top closure except for securing the filling flap in sealed position. The substantially completed cartons are then delivered by the top closing unit 58 to the discharge conveyor 59 which carries the cartons to an appropriate mechanism for coating or impregnating them with a moistureproof substance such as paraffin and at the same time performing the necessary sterilization.

It is with the body forming unit 55 and its driving mechanism that the present application is particularly concerned. Consequently, the description which follows will be confined primarily to the unit 55 and its operation.

*The blank*

As a preliminary to a detailed description of the body forming unit 55 and its relation to the rest of the machine 50, it will be helpful to consider a single carton blank and the various stages through which it passes during the body forming operation. These stages are illustrated in Figs. 24 to 32, inclusive.

Referring to Fig. 24, it will be noted that the operation starts with a flat blank 60 such as the one disclosed in copending Dixon application Serial No. 135,430, supra. The blank is precut and scored to define the various panel areas which form the carton body and its associated top and bottom end closures. Thus the blank 60 has impressed thereon a series of spaced apart, vertical score lines 61, 62, 63 and 64 which define carton side panels A, C, D and fractional side panels E and B, such fractional side panels together being adapted to define eventually a side panel with dimensions conforming to those of the panels A, C and D. The blank 60 also carries transverse score lines 65, 66 running from one edge of the blank to the other and intersecting the score lines 61, 62, 63 and 64 at right angles. Hinged to their associated side panels along the score line 65 are major bottom closure flaps AA and DD, as well as minor bottom closure flaps BB, CC and EE. A number of top closure elements are connected to the side panels along the score line 66. Such elements, in turn, carry major top closure flaps *aa* and *dd*. The closure flap *aa* comprises a filler flap 68 and a lift flap 69, the latter having a transversely scored extension 70 which ultimately defines a gripping tab and reclosure means. The top closure flap *dd* has a relatively large central opening 71 adapted to serve as a combined filling and dispensing aperture. To permit the various parts of the blank 60 to be secured together, selected marginal areas of the blank and certain of its closure elements are coated with an appropriate thermoplastic adhesive 72.

As indicated earlier herein, the feeder mechanism 54 is adapted to withdraw the blank 60 from a stack and to present the blank to the unit 55 in a vertical position. In such position, the blank will have its outside face in leading relation and its inside face in trailing relation with respect to the direction in which it will be moved by the unit 55. The blank is shown in this condition in Fig. 24.

As the blank 60 commences to travel along its path of movement through the unit 55, indicated by the heavy arrow, the side panel B and its associated top and bottom closure parts are folded through an angle of about 90° toward the inside face of the side panel A, the folding taking place along the score line 61. Simultaneously, the side panels C, D and E, together with their associated top and bottom closure parts, are folded as a unit through an angle of about 90° toward the inside face of the side panel A, such folding taking place along the score line 62. The lift flap projection 70 is also simultaneously folded in the same direction about transverse score line 74. Fig. 25 clearly illustrates the blank in this condition.

With subsequent travel of the blank 60, the side panel D and fractional side panel E and their related top and bottom closure parts are folded as a unit through an angle of 90° toward the inside face of the side panel C, such folding taking place along the score line 63. This action places the blank in the condition illustrated in Fig. 26.

With still further travel of the blank, the fractional side panel E and its associated top and bottom closure parts are folded along the score line 64 through 90° and toward the inside face of the side panel D. Such folding also causes the fractional side panel E to overlap the marginal edge portion of the outside face of the fractional side panel B. The formation of an adhesive bond between the overlapping portions of the fractional side panels B and E results in forming the blank into an open-ended rectangular tube as shown in Fig. 27.

Referring next to Figs. 28 to 32, inclusive, the various steps in closing the bottom of the formed carton blank 60 are there illustrated. Starting with the blank in the form of an open-ended rectangular tube as shown in Fig. 27, it will be noted, upon reference to Figs. 28 and 29, that the trailing major bottom flap DD of the moving body 60 is deliberately retarded, while the leading major bottom flap AA is deliberately advanced. The minor bottom flaps CC and BB—EE are then tucked or folded inwardly, as indicated in Figs. 29 and 30. With further movement of the blank 60, the trailing major bottom flap DD is accelerated and upfolded against the minor bottom flaps CC and BB—EE, as shown in Figs. 30 and 31. A very short time later, the leading major bottom flap AA is upfolded against the flap DD, as shown in Figs. 31 and 32. The subsequent application of heat and pressure activates the adhesive 72 on the bottom flaps and secures them in closed position. This completes the work of the body forming unit and the erected carton, with its bottom closed and its top still open, is thereupon presented in this condition to the preformer unit 56 of the machine.

*The body forming turret*

The body forming unit 55 comprises a forming turret 75 (Figs. 1, 2, 4 and 7) mounted on the machine base 51 for rotation about a generally vertical axis. The turret 75 includes a hollow upright turret shaft 76 journaled within an upstanding column 78 integral with or otherwise rigidly fixed to the base 51. The shaft 76 is spaced and supported within the column 78 by means of a pair of antifriction bearings 79, 80 adapted to withstand both radial and axial loading. Power to rotate the turret 75 is transmitted thereto by ring gear 81 fixed to an appropriate hub member 82 which, in turn, happens to be drivingly connected to the lower end of the shaft 76 through a key 84.

Adjacent its upper end, the turret shaft 76 is provided with a relatively large annular turret head 85 which in this case is fashioned as a hollow, internally ribbed cylindrical casting. The head 85 rests upon a shoulder 86 integral with the shaft 76 and is maintained in place thereon by means of a retainer collar 88. A key 89 connects the head 85 and the turret shaft 76 for rotation in unison. The head 85 is surmounted by a convex cover 90 which protectively encloses certain mechanism mounted on the head 85 and the upper portion of the turret shaft 76. The cover 90 may be detachably secured in place as by means of a centrally located knob fitting 91.

Provision is made in the body forming unit 55 for simultaneously conducting a number of different forming operations on a continuous procession of blanks without varying or interrupting their movement through the machine. This is accomplished by the use of a plurality of body forming mandrels 92 (Figs. 1, 4, 7 and 9), mounted in circumferentially spaced, depending relation on the turret head 85, and also by the use of associated manipulating, holding and heating devices. While various members of mandrels may be used in a particular machine, it has been found convenient in the present instance to utilize a total of fourteen. Since the mandrels 92 are of identical construction, a detailed description of one will suffice for all.

Referring more specifically to Figs. 7 and 9, it will be noted that each mandrel 92 has a depending portion of substantially square cross section which abuts against the underside of the turret head 85. The mandrel is held in the head 85 by means of a tubular upper portion 94 telescopically mounted in vertically alined bores 95 formed in the structure of the turret head. The tubular portion 94 is threaded adjacent its upper end and engages a retainer collar 96 which bears against the top of the head 85.

The depending portion of each mandrel 92 has four flat, generally rectangular side faces 98, 99, 100, 101, and bottom face 102 (Figs. 9–13, inclusive, 17 and 18). Corner chamfers 104 of relatively narrow width separate the mandrel side faces. For convenient reference, the face 98 may be called the leading face, the face 99 the trailing face, the face 100 inboard face, and the face 101 the outboard face. As clearly illustrated in Figs. 17 and 18, the mandrels 92 are oriented on the head 85 with their inboard faces 100 uniformly tangent to an imaginary circle concentric with the rotational axis of the turret 75.

Rigidly fixed to the leading face 98 of each mandrel 92 and situated near the upper end of such face is a tab bracket 105 (Figs. 7, 9 and 17). The latter is substantially coplanar with the face 98 and projects from the outboard edge thereof, its purpose being to facilitate breaking of the tab projection 70 of the blank about its score line 74.

Embedded in the inboard face 100 of each mandrel 92 is a side seam heater 106 which may conveniently be of the electrical resistance type. The heater 106 (Figs. 9, 10 and 11) is mounted in an elongated recess in the mandrel face 100 and is retained in place by means of a shoe 108 flush with the face 100. Electrical power may be applied to the terminals 109, 110 of the heater 106 via a passage 111 extending longitudinally of the upper portion of the mandrel 92 and communicating with the interior of the turret head 85 via an aperture 112 (Fig. 9).

At its lower end, each mandrel is provided with a bottom heater 114 of annular form and housed within an appropriate recess in a bottom shoe or sole plate 115. The latter is secured to the mandrel body by means of a central cap screw 116 affording the plate 115 a limited amount of lost motion in a vertical direction. The plate 115 is yieldably biased downwardly by means of a coiled compression spring 118 which surrounds the shank of the screw 116. Turning of the sole plate 115 about the screw 116 is precluded by the depending end of the heater shoe 108. Electrical power may be supplied to terminals 119 of the bottom heater 114 via a wireway 120 in the mandrel body communicating with the passage 111 and the aperture 112. The wireway 120 may be covered by an access plate 121 lying flush with the outboard face 101 of the mandrel.

For the purpose of ejecting the carton body formed thereon, each of the mandrels 92 is provided with an ejecting means which in this instance is operable by compressed air. As indicated in Figs. 5 and 9, the upper end of each mandrel 92 is fixed to a large diameter valve ring having a series of circumferentially spaced ports 124 adapted to register sequentially with an appropriate air supply. Each port 124 communicates directly with an air pipe 125 running downwardly along the passage 111 in the mandrel. The air pipe 125 terminates at its lower end in a downwardly extending central air passage 126 in the body of the mandrel. Air is fed from the lower end of the passage 126 via radial passages 128, longitudinal passages 129 and sleeves 130, eventually being discharged at the bottom face 102 of the mandrel via restricted apertures 131 (Figs. 11, 12 and 13). The sleeves 130 may be fast in the mandrel body 92 and slidable relative to the sole plate 115, forming a telescoping conduit which is in communication between the passages 129, 131 even though the sole plate shifts relative to the mandrel body. The discharged air exerts a downward thrust on the closed bottom of the carton body and thus slides the latter off the mandrel 92.

Supported on the turret head 85 and operatively associated with the mandrels 92 are a plurality of holders 132, one such holder being provided for each mandrel (Figs. 14, 15, 17 and 18). Each holder 132 comprises an upright holder bar 134 which is adapted to bear yieldably against the outside face of the carton blank 60 and thereby maintain the side panel A in registry with the leading face 98 of the associated mandrel.

As indicated clearly in Figs. 14 and 15, each holder bar 134 is rigidly fixed in depending relation to an oscillatory crank arm 135, the latter being freely journaled for oscillation in a horizontal plane about a bushing 136 mounted in the turret head 85. Oscillatory movement is imparted to the holder bar 134 and crank 135 by means of a vertically disposed spindle 138 journaled in bearings 139 within the turret head 85. The spindle 138 has a lower end portion 140 passing through the bushing 136 and terminating within a split hub fitting 141 which is rigidly clamped to the spindle portion 140 by means of a set screw 142. A leaf spring 144 provides a yieldable, but direct mechanical connection between the hub fitting 141 and the outer end portion of the crank 135.

At its upper end, the holder spindle 138 has rigidly fixed thereon a crank arm 145. The latter carries adjacent its free end a follower roller 146 which rides in a cam track 148. The track 148 is formed as a groove in a stationary annular holder cam 149 overlying the turret head 85 (Figs. 4, 7 and 14).

Also operatively associated with the mandrels 92, and corresponding in number therewith, are a plurality of oscillatory closer members 150 (Figs. 8, 15, 17 and 18). Each of these members is constructed and arranged to fold the fractional side panel E of one carton blank 60 about the score line 64 and against the inboard face 100 of an associated mandrel 92, where the fractional side panel E overlaps the fractional side panel B. Each closer member 150 also yieldably presses the overlapping portions of these fractional side panels together until the thermoplastic adhesive has been activated by the side seam heater 106 to form an adhesive bond.

Referring specifically to Fig. 8, the closer member per se is a segmental structure which, in the present instance, comprises three horizontally disposed, vertically spaced arcuate ribs 154, 155 and 156. Intermediate their leading and trailing extremities the ribs 154, 155, 156 are relieved by alined circular openings 158 adapted to receive the fractional side panel E as an incident to folding the same. The ribs 154, 155, 156 terminate at their left-hand ends (as viewed in Fig. 8) in a substantially cylindrical surface 159. The surface 159 is centrally notched to receive a bar-like side seam shoe 160 (Figs. 8, 15 and 16). The latter is retained in place with a limited amount of radial lost motion by means of stud bolts 161. Coiled compression springs 162 appropriately recessed behind the shoe 160 yieldably bias the latter in an outward direction so that it projects radially a slight amount beyond the cylindrical surface 159.

The closer members 150 are all individually mounted for oscillatory movement in a horizontal plane. For this purpose, each member 150 is provided with a split socket 164 adapted to be clampingly secured to the depending end of a closer spindle 165 journaled within the turret head 85 by bearings 166 (Figs. 6 and 7). Each closer spindle 165 has an elongated upper end portion 168 carrying a drive pinion 169, the latter being connected to the spindle portion 168 as by means of key 170. Journaled freely on the upper end portion 168, but situated above the pinion 169, is a gear sector 171. This sector is fashioned with an upstanding boss 172 carrying a cam follower 174 which rides in a track 175 situated in a large stationary annular closer cam 176 (Figs. 4–7, inclusive). Upon reference to Figs. 5 and 6, it will be noted that each gear sector 171 is skewed downwardly relative to the axis of the gear spindle upon which it is journaled and thus meshes with the drive pinion 169 of the adjacent closer spindle. It will be appreciated, therefore, that the oscillation imparted to a given closer spindle 165 is derived from the cam-following gear sector 171 which is journaled on the upper portion 168 of the adjacent closer spindle 165.

Turret head service connections

Turning now to the service connections for the body forming turret 75, it will be perceived upon reference to Figs. 4 and 7 that a hollow service tube 178 is telescopically housed within the turret shaft 76, being centered therein as by means of an upper antifriction bearing 179 and a lower sleeve bearing 180. The service tube may be precluded from rotation in a variety of ways, such being accomplished in this instance by use of a bracket 181 within the base 51. The service tube 178 has a longitudinal bore 182 running from its lower end to its upper end, the latter terminating at a point considerably above the turret head 85.

Electric wiring for the mandrel heaters of the turret head 85 is lead from appropriate three phase, alternating current source via a conduit 184 housed within the longitudinal bore 182 of the service tube (Fig. 4). The conduit 184 terminates at the upper end of the service tube and the wiring therefrom is thereupon lead to slip rings 185 separated by insulators 186. The slip rings and insulators 185, 186 are maintained as a unitary assembly upon a bushing 188, the latter being nonrotatably fixed to the upper end portion of the service tube by key 189. The bottom of the spring and insulator bushing 188 abuts against hub 190 of spider 191 which carries the annular holder and closer cams 149, 176, the hub 190 being nonrotatably fixed to the service tube by means of key 192. Both the cam spider 191 and bushing 188 of the slip ring and insulator assembly are held against axial withdrawal from the service tube 178 by means of retainer collar 194.

As indicated in Fig. 7, electrical power is transmitted from the slip rings 185 to brushes 195 which in this instance are carried by a brush housing 196, the latter being dependably fixed to a radially extending and downwardly drooping arm 197 rotatable with the turret head 85. The electrical connections from the brushes 195 to the individual heaters carried by the mandrels 92 pass through a radially and downwardly extending conduit 198 (Figs. 5 and 7) but the actual wiring has been omitted from the drawings for purposes of simplicity in illustration. Those skilled in the art will readily appreciate the various courses that such wiring could follow and also the fact that the mandrel heaters 106 and 114 would be connected so as to balance the phase loading on the power source.

Lubricating oil pressure is transmitted along the service tube 178 by oil line 199 terminating in top fitting 200 at the upper end of the service tube. From that point, lubricant may be lead to the various internal mechanisms housed within the turret 75 by means of oil line 201 and various branch lines not shown.

Compressed air from a suitable external source is fed to the service tube 178 via an air line 202 which terminates at the lower end of the service tube and communicates directly with the longitudinal bore 182. The bore 182 serves as an accumulator for the compressed air and discharges the same via an air line 204 connected to the upper end portion of the service tube 178.

Members ancillary to body forming turret

Referring more specifically to Figs. 17 to 23, inclusive, the ancillary devices which coact with the mandrels 92 of the turret 75 in their carton body forming operation are there illustrated.

The first such ancillary device is the folder gate assembly 205 (Figs. 17–19, and 21) which, in cooperation with each mandrel passing therethrough, is adapted to change the blank on the mandrel from its initial flat condition as shown in Fig. 24 to its vertically folded condition as shown in Fig. 25. The folder gate assembly 205 comprises a pair of upstanding, laterally spaced gate posts 206, 208 disposed in substantial radial alinement relative to the rotational axis of the turret 75. The posts 206, 208 have lower end portions 209, 210 telescopically secured within eccentrically bored bushings 211, the latter being fitted into appropriate bores within a boss 212 in the machine base 51. The lateral spacing between the posts 206, 208 may readily be adjusted by altering the angular position of either or both of the bushings 211. Upon completion of such adjustment, the set screw 214 carried by each such bushing must of course be tightened. Rigidly fixed to the outboard gate post 206 are a plurality of vertically spaced arcuate guide rails 215, their purpose being to maintain each blank 60 in the condition of Fig. 25 until the next folding operation can be performed. Similarly, the inboard gate post 208 has fixed thereto a series of vertically spaced, arcuate guide rails 216 adapted to maintain the fractional side panel in the condition of Fig. 25 until the closer 150 can act upon it.

At its upper end, the outboard gate post 206 has a relatively long relief notch 218 defining an upstanding segmental extension 219 (Figs. 17, 18 and 21). The extension 219 is arranged to have a relatively slight degree of clearance with the lateral projection 105 on the leading face of each of the mandrels 92. The projection 105 and the extension 219 coact, after the manner indicated in Fig. 17, so as to break the gripping tab extension 70 about its score line 74 as each blank passes the station. The extension 219 may be adjustably positioned and to some extent reinforced as by means of set screw 220 carried at the upper end of angular bracket 221 which may be fixed to the base 51 in any convenient manner.

The next ancillary device to be considered is the rotary breaker 222 (Figs. 17–19, and 22). This device comprises an upstanding spindle 224 journaled in antifriction bearings 225 and carried by a relatively large bushing member 226. The member 226 may be rigidly fixed to the base 51 by means such as machine screw 228. At its upper end, the breaker spindle 224 has rigidly clamped thereto a socket 229 having axially spaced, vertically alined radial fingers 230, 231 and 232 integral therewith. The fingers 230, 231 and 232 are spaced so as to clear the outboard guide rails 215. As indicated in Figs. 18 and 22, the fingers 230, 231 and 232 are adapted to move in a clockwise direction (when viewed in plan) and to break the side panels D, E of the blank 60 as a unit about the score line 63, presenting the free edge of the panel E to the apertures 158 of the closer 150. This manipulation changes the blank from the condition shown in Fig. 25 to that illustrated in Fig. 26.

Power to rotate the breaker spindle 224 and fingers 230, 231, and 232 is derived from a sprocket wheel 234 rigidly fixed to the depending end of the spindle 224.

Turning now to bottom closing assembly 235 (Figs. 19 and 23), it will be noted that the same comprises a pair of relatively short, upstanding spindles 236, 238. These spindles are arranged in laterally spaced and radially alined position relative to the rotational axis of the turret 75 and are adapted to rotate in unison but in opposite directions. As indicated in Fig. 23, the outboard spindle 236 rotates in a clockwise direction while the inboard spindle 238 rotates in a counterclockwise direction. The spindles 236 and 238 carry adjacent their upper ends finger fittings 239 and 240 which are of similar form but opposite hand. Accordingly, it will be noted that the fitting 239 has fixed there to a leading flap finger 241 while the fitting 240 has fixed thereto a similar leading flap finger 242. The fingers 241 and 242 coact to advance the leading major flap AA of each passing blank so as to permit ready infolding of the minor bottom flaps CC and BB—EE. This condition is diagrammatically indicated in Fig. 29, one of the finger fittings being omitted for purposes of simplicity of illustration.

For the purpose of retarding the trailing major bottom flap DD of each blank so as to facilitate infolding of the minor bottom flaps, the assembly 235 is provided with a rigid upstanding pin 244. The vertical position of the pin 244 may readily be adjusted as by means of nut 245 to make certain that the upper end of the pin 244 will intercept each flap DD in the desired manner.

The finger fittings 239, 240 also carry respectively integral tucking fingers 246 and 248. As those skilled in the art will readily appreciate, when the major bottom flaps have been held clear, the finger 246 serves to tuck in the minor bottom flap CC of each blank while the finger 248 tucks in the other minor bottom flap BB—EE.

The finger fittings 239, 240 are further provided respectively with trailing flap fingers 249, 250. The fingers are designed to engage the trailing major bottom flap DD of each blank and to accelerate the same forwardly and upwardly into abutting relation with the infolded minor bottom flaps prior to upfolding of the leading major bottom flap AA. This last step is accomplished by means of a fixed ramp 251 which accosts the leading major bottom flap AA as the blank 60 moves away from the finger fittings 239, 240.

The bottom closer spindles 236, 238 are mounted on the base 51 in a manner similar to that in which the breaker spindle 224 is mounted, being journaled in bearings 252 carried by fixed bushings 254. Power to rotate the spindles 236, 238 and their associated fingers is transmitted to the former by means of a pair of sprocket wheels 255, 256 fixed to their lower ends (Figs. 3 and 4).

For the purpose of completing the bottom closure after the blank has been placed in the condition shown in Fig. 32, the body forming unit 55 is provided with a relatively long, arcuate heater shoe 258. This member is secured upon brackets 259, 260 and 261 rigidly fixed to the base 51 (Figs. 4, 19 and 20).

The shoe 258 in this instance happens to be of horizontally split construction and has embedded therein an electrical heater 262 also of arcuate form. The heater 262 may be energized from the electrical power source associated with the machine 50 and is equipped with appropriate connecting terminals 264 (Fig. 20). The upper face of the shoe 258 adjacent the ramp 251 has a gradual incline 265 and a somewhat more abrupt incline 266 which are adapted to progressively increase the pressure exerted on the closed bottom flaps of each blank as they are squeezed between the resiliently loaded sole plate 115 of each mandrel and the upper face of the shoe 258. So that this pressure may be applied over the optimum areas of the carton bottom, the face 102 of the sole plate 115 may be suitable grooved or ridged as indicated in Figs. 11, 12 and 13.

To preclude deformation of the trailing side panel D of each blank due to the frictional drag between the carton bottom and the upper face of the shoe 258, each holder bar 134 is provided at its lower end with an abutment 268 (Figs. 14, 15, 17 and 18). Each holder 132 is timed so that as the preceding mandrel reaches the shoe 258, the holder 135 will be swung forwardly, interrupting contact between the holder bar 134 and the blank on the mandrel behind and bringing the abutment 268 into contact with the lower end of the side panel D on the preceding mandrel.

Since the turret 75 and its associated mechanism are capable of folding and closing the blanks 60 about their associated mandrels 92 at a much more rapid rate than the adhesive on each blank can be activated into a bond of suitable strength, this condition is nicely met in the unit 55 by making the shoe 258 of relatively great arcuate length. Thus the combined action of the mandrel bottom heater 114 and the elongated heater 262 of the shoe 258 is applied over a sufficient time interval to achieve the desired strength in the adhesive bond securing the bottom flaps in closed position.

Referring next to the manner in which the formed blanks 60 are ejected from their associated mandrels at the far end of the shoe 258, it will be noted upon reference to Figs. 5, 7 and 34 that the stationary closer cam 176 carries an air ejector valve 270. The valve 270 is supported in depending relation from a bracket 271 rigidly fixed to the top of the cam member 176 and projecting radially therefrom. The bracket 271 and valve 270 are located in a position which defines the discharge station for the formed carton bodies.

Referring to Fig. 34, it will be noted that the valve 270 in this case happens to be of the pressure balanced, poppet type, comprising a body 272 and a spring-loaded valve spool 274. The latter is normally biased in a closed position by its loading spring 275 but can be opened in response to a thrust brought against its stem 276 as a result of clockwise movement of the rocker arm 278 (as viewed in Fig. 34). The rocker arm 278 extends downwardly in a position where it sequentially intercepts each of a series of rocker actuators 279 carried by the turret head 85. Each roller actuator 279 is situated in a position of radial alinement with a corresponding one of the mandrels 92 and its air intake port 124.

Air is supplied to the valve 270 via the air line 204 and, upon opening of the spool 274, is adapted to leave the valve body via a port 280 formed in a face 281 which substantially abuts against the upper face of the valve ring 122. By reason of this arrangement, when each of the mandrels 92 reaches its discharge station, the ports 124 and 280 are brought into registration and the valve spool 274 is simultaneously opened as a result of contact between the roller actuator 279 and the rocker arm 278. This permits the relatively large accumulated volume of air housed within the bore 182 of the turrent service tube 178 to discharge suddenly through the mandrel and against the inside of the carton body which is nested against the sole plate 115. The resulting downward blast of the discharge air rapidly slides the formed carton body off the mandrel and leaves the body at the discharge station.

*Transfer mechanism*

Formed carton bodies ejected from the mandrels 92 in the manner just described are discharged successively into a tapered chute 282 (Figs. 33 and 35) situated adjacent the far end of the arcuate shoe 258 and supported by a bracket 284. The latter is rigidly fixed to the bracket 261 which supports the far end of the shoe 258. The chute 282 is open on its outboard side and at its lower end, being adapted to drop each carton body downwardly so that its bottom rests upon a supporting table 285.

The structure of the chute 282 is appropriately relieved to permit a procession of upright conveyor buckets 286 to be traversed across its lower end portion. The buckets 286 are moved in an orbital path by means of double roller chain 288 which is confined between fixed guides 289 rigidly attached to the machine base 51. Each bucket 286 is fixed to the chain 288 as by means of an integral offset bracket 290 and comprises an upstanding side panel provided with relatively long trailing fingers 291 and somewhat shorter leading fingers 292.

Each formed carton body 60, upon dropping through the chute 282 onto the table 285, occupies a position comparable to that indicated in Fig. 33. The formed carton body is temporarily confined in that position by a gate 294 which partially closes the outboard side of the lower end of the chute. The gate 294 has rigidly fixed thereto a fingerlike projection or kicker 295 (Fig. 33). Both the gate 294 and the kicker 295 are adapted to oscillate horizontally in timed relation to the movement of the conveyor buckets 286. As an incident to such action, the kicker 295 pushes each formed carton body 60 into an approaching one of the conveyor buckets 286, the carton body 60 simultaneously being shifted along the table 285 and out from under the chute 282.

The gate 294 and kicker 295 are carried by a hublike fitting 296 which is adjustably but nonrotatably secured to the upstanding end of a kicker spindle 298. The latter is journaled in bearings 299 housed within a bushing 300 mounted on the machine base 51. At its lower end, the spindle 298 has rigidly fixed thereto a cam-follower arm 301 terminating in a cam follower 302 which, in this instance, is controllably oscillated by means of a barrel cam 304.

To protect the machine 50 against the adverse results which might otherwise follow a jam of carton bodies in the chute 282, the far sidewall thereof is equipped with a hinged panel 305 (Fig. 35). The latter is pivoted upon a pin or bolt 306 and it is biased by spring 308 into the normal position shown in Fig. 35. The panel 305 is connected as by means of arm 309 to a rotary actuator 310 associated with control switch 311 (Fig. 33). Outward movement of the chute panel 305 resulting from a jam of carton bodies rotates the actuator 310 and cams an associated plunger 312 in the proper direction to operate the control switch 311. The latter immediately cuts off power to the machine 50 and effects application of a built-in mechanical brake to prevent further coasting of the machine.

A further safety device is situated between the chute assembly just described and the top preformer unit 56 which receives the formed carton bodies from the body forming unit 55. Such device comprises a relatively long, angular safety shoe 314 (Figs. 33 and 35) which is arranged to maintain the formed carton bodies in their associated conveyor buckets 286 until the latter reach guard rails 315 of the preformer unit 56. The safety shoe 314 has fixed thereto a depending angular arm 316 which terminates in a rotary switch actuator 318 generally similar to the actuator 310. As indicated in Fig. 36, rocking movement of the actuator 318 cams plunger 319 downwardly, to actuate safety switch 320. Consequently, a jam of one or more carton bodies against safety shoe 314 will rock the shoe 314, arm 316, and actuator 318 in a clockwise direction (as viewed in Fig. 36), actuating the safety switch 320 and stopping the machine in the manner already described.

*Drive arrangement*

The body forming turret 75 and the mechanisms associated therewith are driven in timed relation with each other by a prime mover such as an electric motor 321 housed within the machine base 51. Referring to Figs. 1 and 3, it will be noted that the motor 321 is connected as by means of belts 322 and pulley 324 to a high-speed shaft 325 journaled within the machine base 51. The shaft 325 carries a worm 326 which meshes with worm wheel 328 drivingly mounted on a line shaft 329. At its left-hand end (as viewed in Fig. 3), the shaft 329 carries a bevel pinion 330. The latter, through a similar bevel pinion (not shown) drives a relatively short vertical shaft 331. Keyed or otherwise nonrotatably fixed to the shaft 331 is a pinion 332 which drivingly meshes with the ring gear 81 of the body forming turret 75. The gear 81 has a driving connection with the upright turret shaft 76 through hub member 82.

Also nonrotatably secured to the vertical shaft 331 is sprocket wheel 334 which is drivingly connected by chain 335 to the sprocket wheel 234 of the rotary breaker 222 and also to the sprocket wheels 255, 256 of the bottom closing mechanism 235. An optimum amount of tension in the chain 335 may be maintained by means of idler sprocket 336.

Mounted on line shaft 329 between the worm wheel 328 and the pinion 330 is a bevel gear 338. This gear meshes with bevel pinion 339 fixed to cross shaft 340. The latter drives barrel cam 304 of the kicker mechanism and, through sprocket wheel 341, is adapted to drive the feeder mechanism 54.

The drive mechanism just described is also equipped with a suitable brake for protecting the machine in event of emergency shutdown occurring, for example, in response to actuation of a safety device. The brake is preferably of the spring-applied, solenoid-released type and is operatively associated with one of the power transmitting shafts. When the driving motor 321 is energized, the brake solenoid is also energized so as to maintain the brake in "off" position. Upon de-energizing of the motor 321, the solenoid automatically becomes de-energized to permit application of the brake by its loading spring.

To permit the moving parts of the machine 50 to be turned over manually for set-up, adjustment, or checking purposes, there is mounted on the base 51 a hand crank 350. The latter is fixed to a crankshaft 351 journaled in a boss member 352 which is recessed in one side of the base 51. At its inner end, the crankshaft 351 carries a clutch element 354 adapted to engage a coacting clutch element 355 fixed on the end of the shaft 325. A spring 356 maintains the clutch elements 354, 355 in a normally disengaged condition. When the crank 350 is to be used, however, an inward thrust on the latter is sufficient to overcome the pressure of the spring 356 and permits the user to readily engage the clutch elements 354, 355.

A safety interlock switch 358 is mounted adjacent the inner end of the boss member 352, being actuated by a disk element 359 fixed to the crankshaft 351. When the crank and crankshaft 350, 351 are thrust inwardly by a user desiring to operate the machine manually, the switch 358 serves to interrupt the supply of power to the driving motor 321. The switch 358 does not, however, interrupt the supply of power to the brake controlling solenoid and thus maintains the brake in a released condition so that the machine can be turned over with a moderate amount of force on the crank 350.

*Operation*

While the operation of the body forming unit 55 will probably be apparent to those skilled in the art, it will be helpful at this point to provide a comprehensive summary of operation. For this purpose, reference will be had primarily to Figs. 17, 18 and 37.

In Fig. 17, the pickup station at which the mandrels 92 are successively intercepted by the blanks presented by the feeder mechanism is designated by the reference numeral (1). Subsequent operating stations at which certain steps are performed on the blanks as they move around their respective mandrels 92 are designated by the numerals (3), (5), (7), (9), and (11). For convenience of illustration, an alternate series of operating stations (2), (4), (6), (8), (10), and (12) angularly advanced from the others has been shown as separate Fig. 18 rather than being included in Fig. 17. Fig. 18 also differs from Fig. 17 in that Fig. 18 represents a section through the mandrels taken below the lateral projections 105 rather than above them. While operations at these various stations are taking place simultaneously upon a plurality of blanks, the present description will be simplified by assuming that each operating station represents a particular step in the progress of a single blank through the forming unit 55.

In station (1) the blank 60 intercepts the mandrel 92 and the holder bar 134 of the adjacent holder 132 immediately presses the side panel A of the blank against the leading face 98 of the mandrel. The blank thereupon becomes firmly gripped between the holder bar 134 and the mandrel 192 and snaps out of the guides of the feeder mechanism (not shown), passing to station (2).

At this point, the closer 150 commences to leave its dwell position and to move in a counterclockwise direction toward the mandrel 92. As the mandrel and blank move from station (2) to station (3), the outwardly extending panel areas adjacent the side panel A are accosted by the upright posts 206, 208 of the folder gate 205. This folds the fractional side panel area B and its associated closure parts against the inboard face 100 of the mandrel and also folds the panel areas C, D, E and their associated closure parts toward the outboard face 101 of the mandrel, placing the blank in the condition of Fig. 25. The lateral projection 105 on the leading face of the mandrel and the upright extension 219 on the folder gate post 206 also coact to break the tab portion 70 of the blank rearwardly about its score line 74. The counterclockwise movement of the closer 150 also continues.

Further movement of the turret 75 brings the mandrel and its associated blank from station (3) to station (4), the guide rails 215, 216 of the folder gate serving to maintain the panel areas of the blank in their partially folded condition. As the mandrel and blank pass from station (4) to station (5), the leading end portion of the closer 150 presses the fractional side panel B against the inboard face 100 of the mandrel, the closer 150 continuing to bear against the panel B while continuing its counterclockwise movement.

As the blank is moved from station (5) to station (6), the fingers of the rotary breaker 222 overtake the trailing side panels D, E, and their associated closure parts, folding them forwardly as a unit against the trailing face 99 of the mandrel. As the same time, the free edge of the fractional side panel E enters alined circular apertures 158 of the ribs of closer 150.

As an incident of movement of the mandrel from station (6) to station (7), the closer 150 folds the fractional side panel E forwardly against the inboard face 100 of the mandrel and into overlapping relation with the fractional side panel B. At this point, the holder 132 commences to swing forwardly and out of contact with the panel A, the blank being securely held upon the mandrel 92 by the closer 150.

Movement of the blank from station (7) to station (8) results in application of increased pressure against the overlapping panel areas B, E, such pressure being applied by the resiliently loaded shoe 160 of the closer 150 to facilitate activation of the thermoplastic adhesive of the body side seam. Heat for this purpose is of course readily supplied by the side seam heater 106 in the mandrel. Simultaneously with the foregoing, the bottom flaps of the carton body are closed by the mechanism 235 and are brought into contact with the ramp 251 leading to the arcuate heated shoe 258.

As the mandrel passes from station (8) to station (12) and thence toward the discharge station over the chute 282, the closer 150 continues to dwell and maintain pressure on the carton body side seam. The holder 132 swings forwardly and brings its abutment 268 into contact with the lower portion of the side panel D of the blank on the preceding mandrel, exerting pressure thereagainst to offset deformation which might otherwise result from frictional drag between the bottom of the carton body and the upper surface of the arcuate shoe 258. The succeeding holder 132 does likewise on the blank of the mandrel under consideration here, releasing shortly before the mandrel and blank reach the discharge station.

As the mandrel 92 moves along the shoe 258, the closed bottom flaps are squeezed between the heated mandrel sole plate 115 and the heated arcuate shoe 258. By the time the mandrel and blank have reached the far end of the shoe 258, the adhesive in the bottom closure has been thoroughly activated to form a strong adhesive bond. During this interval, the closer 150 also maintains pressure against the side seam of the carton body and a comparable adhesive bond is created there, the closer 150 moving out of contact with the blank at the discharge station.

As the blank and mandrel depart from the end of the shoe 258 and reach the discharge station, the formed carton body is ejected from the mandrel by a blast of compressed air in the manner already described and drops into the tapered discharge chute 282. From the latter, the formed carton body is presented to a conveyor bucket 286 which carries the body to the preformer unit 56 of the machine.

I claim as my invention:

1. In a machine for making cartons from cut and scored blanks of paperboard or the like and having a plurality of side panels and two fractional side panels, a body forming unit comprising, in combination, a machine base, a turret shaft journaled in said base for rotation about an upright axis, a turret head fixed adjacent the upper end portion of said turret shaft for rotation bodily therewith, a plurality of body forming mandrels fixed in circumferentially spaced depending relation on said turret head, a plurality of holders carried by said turret head for holding said blanks against said mandrels, a plurality of seam closers rotatably carried by said turret head and having arcuate portions with openings therein for manipulating the fractional side panels of said blanks about said mandrels and into overlapping seam relation, cam means fixed to said base for actuating said holders and said closers as an incident to movement of said turret head relative to said base, a folder gate assembly, and a bottom flap closing assembly, said folder gate and bottom flap closing assemblies being fixed to said base and disposed for coaction with said mandrels, holders, and closers to complete the formation of carton bodies from said blanks.

2. In a machine for making cartons from cut and scored blanks of paperboard of the like having a plurality of side panels and two fractional side panels and having thermoplastic adhesive thereon, a body forming unit comprising the combination of a machine base, a turret shaft journaled in said base, means for continuously rotating said shaft, a turret head fixed to one end of said turret shaft for rotation bodily therewith, a plurality of body forming mandrels fixed in circumferentially spaced relation on said turret head, a plurality of holders carried by said turret head for yieldably holding said blanks against said mandrels, a plurality of seam closers rotatably carried by said turret head and having arcuate portions interrupted by openings for manipulating the fractional panels of said blanks about said mandrels and into overlapping seam relation, cam means fixed to said base for actuating said holders and said closers as an incident to movement of said turret head relative to said base, a folder gate assembly, and a bottom flap closing assembly, said folder gate and bottom flap closing assemblies being fixed to said base and disposed for coaction with said mandrels, holders, and closers to complete the formation of carton bodies from said blanks as each mandrel is continuously moved thereby, means within each said mandrel for heating selected areas of the blank thereon to activate the thermoplastic adhesive on the blank, means fixed to said base for heating selected areas of each blank in cooperation with the heating means of its associated mandrel, means defining an air passage within each said mandrel for ejecting the completed carton body therefrom by a blast of air, and means for supplying air to each mandrel including a hollow passageway through said turret shaft.

3. In a machine for making cartons from flat blanks of paperboard or the like selectively coated with thermoplastic adhesive, a carton body forming mandrel comprising, in combination, a tubular upper portion susceptible of attachment to a rotary turret, a body forming portion of substantially square cross section having a plurality of side faces corresponding to the side panel areas of the carton body, a side seam heater embedded within one of the side faces of said mandrel, a heater shoe overlying said side seam heater and mounted flush with said one side face of said mandrel, a sole plate corresponding in cross section to said body forming portion of said mandrel and having an end face corresponding to the bottom closure area of the carton body, said sole plate having a lost motion connection with said forming portion of said mandrel, a resilient member interposed between said forming portion of said mandrel and said sole plate, a bottom closure heater embedded within said sole plate, means defining an air passage within said body forming portion, and means defining air discharge passages in said sole plate, and means including telescoping conduits communicating between the passage in said body forming portion and the passages in said sole plate even though the latter is shifted relative to said body forming portion.

4. In a machine for making cartons from cut and scored blanks of paperboard or the like, the combination comprising a machine base, an upstanding hollow shaft journaled in said base, means for continuously rotating said shaft, a turret head fixed adjacent the upper end portion of said hollow shaft for rotation bodily therewith, a plurality of body forming mandrels fixed in circumferentially spaced relation on said turret head, electric heating means in said mandrels, means carried by and movable relative to said turret head for holding said blanks against said mandrels, movable seam closing means also carried by said turret head for manipulating said blanks about said mndrels, a service tube fixed to said base and extending through said hollow shaft, and cam means fixed to the upper end portion of said service tube for actuating said holding and said manipulating as an incident to rotation of said shaft and turret head, whereby said service tube not only supports said cam means but may contain electric wiring leading to said heating means.

5. In a machine for making cartons from cut and scored blanks of paperboard or the like, the combination comprising a base, an upright hollow shaft journaled in said base, means for continuously rotating said shaft, a turret head fixed adjacent the upper end portion of said hollow shaft for rotation bodily therewith, a plurality of body forming mandrels fixed in spaced relation on said turret head, means carried by and movable relative to said turret head for holding and manipulating the blanks relative to said mandrels, an electric heater within each said mandrel, a service tube fixed to said base and extending through said hollow shaft, cam means fixed to the upper end portion of said service tube and disposed for actuation of said holding and manipulating means, an oil line extending through said service tube for supplying lubricant to said holding, manipulating, and cam means associated with said turret head, a conduit for electrical conductors, said conduit extending through said service tube and terminating adjacent said turret head, and a slip ring and brush assembly interposed between said service tube and said turret head for transmitting electric power from the conductors of said conduit to said heaters in said mandrels.

6. In a machine for making cartons from cut and scored blanks of paperboard or the like, the combination of a base, an upright hollow shaft journaled at its bottom portion in said base, means for continuously rotating said shaft, a turret head fixed adjacent the upper end of said hollow shaft for rotation bodily therewith, a plurality of body forming mandrels fixed in spaced relation on said turret head, each said mandrel having an ejector air passage therein, an electric heater within each said mandrel, a stationary service tube fixed to said base and extending through said hollow shaft, said service tube having an air accumulating longitudinal passage therein, means supplying compressed air to said longitudinal passage, an electrical power supply conduit for said turret head and extending upwardly through said service tube, an air ejector valve rigidly supported by the upper end of said service tube, and means on said turret head for sequentially opening said valve to admit air from said longitudinal passage of said service tube to the ejector passages of successive ones of said mandrels.

7. In a machine for fabricating cartons from blanks of paperboard or the like cut and scored to define in each blank a pair of major bottom closure flaps and a pair of minor closure flaps, the combination comprising a base, a rotary turret mounted on said base and having a plurality of body forming mandrels mounted in spaced apart depending relation thereon, an upstanding pin fixed to said base below the path of said mandrels and disposed to retard one of said major bottom closure flaps of a passing blank, a pair of bottom closing finger members mounted on said base in spaced apart relation with each other and with said pin but in straddling relation with the path of said mandrels, means for driving said finger members in opposite directions relative to each other and in timed relation with said rotary turret, each said finger member having a fixed finger for advancing the other one of the major bottom closure flaps of said blank, each said finger member also having a second finger for tucking in a respective one of the minor bottom closure flaps of said blank and having a third finger adapted to accelerate said one major bottom closure flap so as to fold it between said minor bottom closure flaps and said other major bottom closure flap.

8. In a machine for fabricating cartons from blanks of paperboard or the like having thermoplastic adhesive selectively applied thereto, the combination comprising a base, a rotary turret mounted on said base and having a plurality of body forming mandrels depending therefrom, each said mandrel having a resiliently loaded sole plate with a face corresponding to the bottom closure area of the carton, a heater embedded in each said sole plate, and a relatively long arcuate shoe fixed to said base adjacent the path of said mandrels and inclined at its area of initial engagement with the carton blanks so as to effect squeezing of the bottom closure of each carton body against said sole plate, and a relatively long arcuate heater embedded in said arcuate shoe.

9. In a continuous motion machine for fabricating cartons of paperboard or the like from flat blanks each having side panels and bottom flaps, a body forming unit comprising, in combination, a stationary base, a turret continuously rotatable relative to said base, a plurality of mandrels secured in circumferentially spaced relation around said turret, means for holding a blank on each of said mandrels as the turret makes substantially a complete revolution, means on said turret and base for manipulating a blank held on one of said mandrels to close the side and bottom flaps of the blank as an incident to rotation of the turret through a relatively small angle, means in said mandrel for heating the face opposite the folded side flaps, closing means including a shoe brought into pressured engagement with the folded side flaps during the rotation of the turret through a relatively great angle to effect an adhesive bond between the side flaps, means for heating the bottom of said mandrel, and an arcuate shoe on said base upon which the folded bottom flaps ride with pressured contact as the turret rotates through a relatively great angle to effect an adhesive bond between the bottom flaps.

10. In a continuous motion machine for making cartons from cut and scored blanks of paperboard or the like and having a plurality of side panels and two fractional panels, the combination comprising a machine base, a turret shaft journaled in said base, means for continuously rotating said shaft, a turret head mounted adjacent one end of said turret shaft for rotation bodily therewith, a plurality of body forming mandrels fixed in circumferentially spaced relation on said turret head, movable holding means carried by said turret head for pressing a blank against the leading face of each said mandrel, rotatable seam closing means also carried by said turret head for manipulating the fractional panels of said blanks about said mandrels and into overlapping seam relation, means including an arcuate heating shoe also fixed to said base for coacting with said mandrels, and means fixed to said base for actuating said holding and said manipulating means as an incident to movement of said turret head relative to said base, said last named means being adapted to shift said holding means to press the preceding blank against the trailing face of the preceding mandrel as the same reaches said arcuate heating shoe.

11. In a continuous motion machine for making cartons from cut and scored blanks, the combination comprising a turret, means for continuously rotating said turret, a plurality of mandrels fixed in circumferentially spaced relation on said turret, means for feeding blanks individually into the paths of said mandrels, a holder associated with each said mandrel and supported by said turret, means for moving each said holder to press a blank first against the leading face of the associated mandrel, means for subsequently wrapping each blank around the associated mandrel as the turret advances, means for retaining each blank wrapped around its mandrel, and means for then moving each of said holders forward to press the preceding blank against the trailing face of the preceding mandrel to preclude deformation of the preceding blank during the further processing thereof.

12. In a continuous motion machine for making cartons from cut and scored blanks, the combination comprising a plurality of mandrels, means for continuously advancing said mandrels in succession along a given path, including a stationary heating shoe, a holder associated with each of said mandrels, and means for moving each holder first against the leading face of its associated mandrel and then against the trailing face of the preceding mandrel as the latter arrives at said stationary heating shoe.

References Cited in the file of this patent
UNITED STATES PATENTS

| | | |
|---|---|---|
| 1,481,757 | Stokes | Jan. 22, 1924 |
| 1,492,707 | Gallea | May 6, 1924 |
| 1,607,292 | Miller | Nov. 16, 1926 |
| 1,689,428 | Farmer | Oct. 30, 1928 |
| 1,703,723 | Corse | Feb. 26, 1929 |
| 1,791,963 | Howard et al. | Feb. 10, 1931 |
| 1,864,632 | Bergstein | June 28, 1932 |
| 1,875,986 | Bronwander | Sept. 6, 1932 |
| 1,885,910 | Gwinn et al. | Nov. 1, 1932 |
| 2,032,343 | Arthur | Mar. 3, 1936 |
| 2,171,418 | Palmer | Aug. 29, 1939 |
| 2,255,954 | Vergobbi | Sept. 16, 1941 |
| 2,357,535 | Monroe | Sept. 5, 1944 |
| 2,364,406 | Vergobbi | Dec. 5, 1944 |
| 2,367,884 | Monroe | Jan. 23, 1945 |
| 2,370,757 | Spurr | Mar. 6, 1945 |
| 2,557,069 | Berkey | June 19, 1951 |
| 2,648,180 | Dalton | Aug. 11, 1953 |